US011047246B2

(12) United States Patent
Klingels

(10) Patent No.: US 11,047,246 B2
(45) Date of Patent: Jun. 29, 2021

(54) BLADE OR VANE, BLADE OR VANE SEGMENT AND ASSEMBLY FOR A TURBOMACHINE, AND TURBOMACHINE

(71) Applicant: MTU Aero Engines AG, Munich (DE)

(72) Inventor: Hermann Klingels, Dachau (DE)

(73) Assignee: MTU Aero Engines AG, Munich (DE)

( * ) Notice: Subject to any disclaimer, the term of this patent is extended or adjusted under 35 U.S.C. 154(b) by 108 days.

(21) Appl. No.: 16/392,278

(22) Filed: Apr. 23, 2019

(65) Prior Publication Data

US 2019/0330992 A1 Oct. 31, 2019

(30) Foreign Application Priority Data

Apr. 27, 2018 (DE) ...................... 10 2018 206 601.9

(51) Int. Cl.
*F01D 9/04* (2006.01)
*F01D 5/02* (2006.01)
*F01D 5/14* (2006.01)

(52) U.S. Cl.
CPC .............. *F01D 9/041* (2013.01); *F01D 5/02* (2013.01); *F01D 5/147* (2013.01); *F05D 2220/32* (2013.01); *F05D 2240/12* (2013.01); *F05D 2250/71* (2013.01)

(58) Field of Classification Search
CPC ... F01D 5/22; F01D 5/225; F01D 5/02; F01D 5/147; F01D 5/146; F01D 5/145; F01D 9/041; F05D 2220/32; F05D 2240/12; Y02T 50/60
USPC ...................................................... 416/241 R
See application file for complete search history.

(56) References Cited

U.S. PATENT DOCUMENTS

| 2,920,864 | A | * | 1/1960 | Lee | ........................ | F01D 5/3007 |
| | | | | | | 416/196 R |
| 3,014,640 | A | * | 12/1961 | Barney | .................. | F04D 29/324 |
| | | | | | | 415/194 |
| 3,193,185 | A | * | 7/1965 | Erwin | ..................... | F01D 5/145 |
| | | | | | | 415/193 |
| 3,572,962 | A | * | 3/1971 | Embleton | ................. | F01D 5/16 |
| | | | | | | 415/119 |
| 4,128,363 | A | | 12/1978 | Fujikake et al. | | |

(Continued)

FOREIGN PATENT DOCUMENTS

| DE | 1108374 | B | * | 6/1961 | ............. F01D 5/145 |
| DE | 1428110 | A1 | | 2/1969 | |

(Continued)

*Primary Examiner* — J. Todd Newton
(74) *Attorney, Agent, or Firm* — Barlow, Josephs & Holmes, Ltd.

(57) ABSTRACT

The invention relates to a blade or vane, a blade or vane segment, and an assembly for a turbomachine, wherein the blade or vane has a blade or vane element with a blade or vane element profile and a radially inner end of the blade or vane element and a radially outer end of the blade or vane element, and wherein the blade or vane has, in addition to the blade or vane element profile, at least one first guide profile in the region of the radially inner end of the blade or vane element (EI) and/or of the radially outer end of the blade or vane element and is spaced apart from the associated blade or vane element end in the radial direction, and extends at least partly in the axial direction and at least partly in the peripheral direction and/or at least partly in the tangential direction.

10 Claims, 11 Drawing Sheets

(56) References Cited

U.S. PATENT DOCUMENTS

| | | | | |
|---|---|---|---|---|
| 5,112,187 | A | * | 5/1992 | Davids .................... F01D 5/145 |
| | | | | 415/169.3 |
| 8,920,127 | B2 | * | 12/2014 | McCaffrey ............ F01D 5/3084 |
| | | | | 416/219 R |
| 2015/0361808 | A1 | | 12/2015 | Botrel et al. |
| 2016/0177833 | A1 | | 6/2016 | Simon-Delgado et al. |

FOREIGN PATENT DOCUMENTS

| | | | | |
|---|---|---|---|---|
| DE | 2135287 A1 | * | 1/1973 | ............. F01D 5/145 |
| DE | 2135287 A1 | | 1/1973 | |
| DE | 102006057063 B3 | | 7/2008 | |
| EP | 0978633 A1 | | 2/2000 | |
| EP | 2194232 A2 | | 6/2010 | |
| EP | 2576987 B1 | | 9/2015 | |
| EP | 3037674 A1 | | 6/2016 | |
| GB | 793143 A | * | 4/1958 | ........... F04D 29/681 |
| GB | 840543 A | * | 7/1960 | ............. F01D 5/145 |

\* cited by examiner

BLADE OR VANE, BLADE OR VANE SEGMENT AND ASSEMBLY FOR A TURBOMACHINE, AND TURBOMACHINE

BACKGROUND OF THE INVENTION

The present invention relates to a blade or vane for a turbomachine, in particular a rotating blade or a guide vane, in particular for a gas turbine, particularly of an aircraft engine, in particular for a turbine stage of a gas turbine, particularly for a low-pressure turbine or for a high-pressure turbine, wherein the blade or vane has a blade or vane element with a blade or vane element profile and a radially inner end of the blade or vane element and a radially outer end of the blade or vane element.

The invention further relates to a blade or vane segment for a turbomachine, in particular a rotating blade segment or a guide vane segment for an above-described turbomachine, wherein the blade or vane segment has at least one first wall segment that delimits a flow channel, in particular a shroud segment or a ring segment, and at least one blade or vane that has a blade or vane element with a blade or vane element profile and a radially inner end of the blade or vane element and a radially outer end of the blade or vane element.

The invention further relates to an assembly for a turbomachine, in particular a row of guide vanes or a stator or a row of rotating blades or a rotor, for an above-described turbomachine.

Furthermore, the invention relates to a turbomachine, in particular a gas turbine, comprising at least one compressor stage or turbine stage.

The fluidic design of the individual components of a turbomachine, in particular of the blades and vanes as well as of the adjoining components or regions that delimit a flow channel in this case take on a substantial importance, in particular in regard to an efficiency that can be achieved with the turbomachine.

Known from the prior art is a large number of fluidically advantageous designs for the individual components of generic turbomachines, for example, from EP 2 194 232 A2, EP 2 576 987 B1, and DE 10 2006 057 063 B3, which each disclose embodiments of designs for fluidic optimization, in particular for reducing flow losses in the region of the ends of the blade or vane elements.

SUMMARY OF THE INVENTION

An object of an embodiment of the present invention is to achieve an altered and, in particular, improved flow in a turbomachine, particularly a flow that is less subject to loss, in particular in the region of the blade or vane element and above all in the region of the ends of the blade or vane element.

This object is achieved by means of a blade or vane having the features of claim 1, by means of a blade or vane segment having the features of claim 9, by means of an assembly in accordance with claim 14 as well as by means of a turbomachine in accordance with claim 15. Advantageous embodiments of the invention are the subject of the dependent claims.

In an embodiment of a blade or vane in accordance with the present invention, a blade or vane for a turbomachine, in particular a rotating blade or a guide vane, which, in particular, is designed for a gas turbine, particularly for a turbine stage of a gas turbine, in particular for a low-pressure turbine or for a high-pressure turbine, has a blade or vane element with a blade or vane element profile and a radially inner end of the blade or vane element and a radially outer end of the blade or vane element.

In accordance with the invention, the blade or vane, in particular the blade or vane element, has, in addition to the blade or vane element profile, at least one first guide profile, which is arranged in the region of the radially inner end of the blade or vane element and/or in the region of the radially outer end of the blade or vane element and is spaced apart from the associated blade or vane element end in the radial direction and which extends at least partly in the axial direction, in particular in the axial direction, and at least partly in the peripheral direction and/or at least partly in the tangential direction, in particular in the peripheral direction and/or, in particular in the tangential direction.

In this way, it is possible to achieve an especially advantageous influencing of the flow in the region of the associated blade or vane element end and flow losses can be reduced.

In the present case, the directional specification "axially" refers in the technically conventional way in each instance to a direction parallel to the rotational axis or (main) machine axis of the turbomachine, the directional specification "peripheral direction" correspondingly refers to a direction of rotation around this rotational axis or (main) machine axis, and the directional specification "radially" refers to a direction that is perpendicular to the axial direction and peripheral direction. The directional specification "tangentially" correspondingly refers to a direction that is perpendicular to the axial direction and to the radial direction.

In the present case, all directional specifications hereby refer in each instance to an installed state of the individual components in a turbomachine or, in connection with a turbomachine, to a functional state of use.

The expression "at least partly" in connection with a directional specification hereby means here that the associated resulting directional vector has a vector component in the direction specified by the expression "at least partly."

In the present case, a "blade or vane element" in the sense of the invention is understood here to mean the flow-relevant region of a blade or vane.

In the present case, the term "profile" is understood to mean a body, such as, for example, a blade or vane element, around which a flow occurs and/or can occur on at least two sides and, in particular, on multiple sides.

In the present case, the term "blade or vane element profile" refers to that part of the blade or vane element that is designed as a profile, that is, a part around which a flow occurs and/or can occur on at least two sides, and via which flow energy can be converted and/or is converted.

In the present case, the term "guide profile" refers to a profile or to a profile section that is designed to influence a flow, in particular to influence a flow in a defined manner, in particular to guide and/or to divert a flow in a defined manner.

In the present case, "profile leading edge" is understood to mean an edge that lies further upstream, in particular the inflow edge, whereas "profile trailing edge" refers to an edge that lies further downstream.

In the present case, the term "main profile" is understood to mean a profile section of a blade or vane element profile of a blade or vane element, in particular a profile section via which preferably more than 80%, in particular more than 90%, of the mass flow can be converted and/or is converted.

Correspondingly, in the present case, the term "secondary profile" refers to a profile section of a blade or vane element profile of a blade or vane element via which only a small part of the flow energy is converted and/or can be converted, in particular a profile section of a blade or vane element via which preferably less than 20%, in particular less than 10%, of the mass flow can be converted and/or is converted. In particular, in the present case, the term "secondary profile" refers to a profile section of a blade or vane element around which only an edge flow flows and/or can flow.

In the present case, in contrast, the term "wall" refers, in particular, to a surface of a body that is subject to an inflow or a surrounding flow from only one side or can be subject to an inflow or a surrounding flow from only one side.

In the present case, a "radially inner end of a blade or vane element" is understood to mean the blade or vane element end lying further inward in the radial direction in a functional installed state of the blade or vane in a turbomachine. A "radially outer" end of the blade or vane element is correspondingly understood to mean the blade or vane element end lying further outward in the radial direction in a functional installed state of the blade or vane in a turbomachine.

When conversion to work occurs in turbomachinery such as turbomachines, losses, that is, so-called flow losses, occur owing to flow processes and can fundamentally be divided into profile losses, wall losses, and gap losses, whereby, as a rule, the mentioned loss mechanisms do not occur independently of one another. Flow losses, for example, occur owing to viscous effects in boundary layers, during mixing processes, during compressive shocks, and during heat transfer.

In the present case, "profile losses" are understood, in particular, to mean the losses that occur owing to the finite thickness of the blade or vane trailing edges as well as flow losses that occur in boundary layers at the blade or vane profiles of a turbomachine due to viscous friction and turbulent dissipation and owing to shocks in the blade or vane passage. In low-pressure turbines, on account of the larger blade or vane heights existing therein, profile losses make up the largest portion of the flow losses as a rule. In low-pressure turbines, the other loss mechanisms play a smaller role than, for example, in high-pressure turbines. It is of great importance in particular in low-pressure turbines, therefore, to achieve a flow that is as optimal as possible in the region of the blade or vane profiles, in particular in the main flow sections thereof.

In the present case, "wall losses" are understood to mean all losses that are caused by the delimiting walls, in particular by inner and outer delimiting walls both inside of and outside of a flow channel or by (wall) boundary layer flows that flow along these delimiting walls. In each case, the losses that are to be ascribed to wall losses occur here through the creation of wall boundary layers and through the interaction of low-impulse secondary flows with the suction-side boundary layer at the blades or vanes as well as through the mixing of the vortices, which are formed as a result of separation in the flow channel, with the main flow. In a turbomachine, the flow field near the delimiting walls is usually characterized by pronounced secondary flows, the strength of which depends largely on the upstream boundary layer thickness and on the diversion of the flow. The formation of secondary flows results, in particular, from the very non-uniform distributions of velocity, pressure, and temperature in the boundary layer. Secondary flows in the region of a row of blades or vanes, in particular in the edge regions of the row of blades or vanes, can result in undesired incorrect inflow at a following row of blades or vanes or at a plurality of the following row of blades or vanes, in consequence of which boundary layer separations can occur upon entry of the flow into a row of blades or vanes. As a result thereof, undesired secondary flows can be created from the separated fluid inside of the flow channel and result in a non-optimal flow, which is subject to substantial losses, at the main profile sections of the individual blades or vanes.

In the present case, "gap losses" are understood to mean losses that occur between stationary and rotating components of a turbomachine, that is, for example, in the gaps between a rotor and a stationary stator both at the housing and at the hub, in particular owing to leakage flows. The causes in each case are pressure differences—for example, the pressure equalization between the suction side and the pressure side at shroudless blades or vanes or between the pressure upstream and the pressure downstream of a row of blades or vanes in the case of shrouded blades or vanes. If gap losses occur, the mass flow through the blade or vane passage is reduced, resulting in a reduced conversion to work and thus having a negative effect on the efficiency. As a rule, the gap flow further causes a vortex flow, the generation of which, as a rule, likewise causes losses.

In the housing region of a turbomachine, as a rule, working gas flows around the rotating blade shroud. In the process, a small portion of working gas flows as a leakage flow upstream of the rotating blades out of the (main) flow channel through the gap between the rotor and the housing and flows downstream back into the (main) flow channel, resulting in gap losses.

In the hub region, the rotor discs have to be shielded from the high gas temperatures in the (main) flow channel. For this purpose, cooling air and/or blocking air can be fed to the rotor, whereby the amount is preferably determined in such a way that, both upstream and downstream of a row of blades, the cooling air and/or blocking air flows out into the (main) flow channel, in particular with a higher pressure than in the working gas, so as, in this way, to prevent the penetration of hot gas into the chambers between the rotor and the stator.

The leakage flows and the cooling flows and/or blocking flows that occur in the (main) flow channel are complex and lead to effects that are similar to those of the previously described wall boundary layer flows. Both the leakage flows in the housing region and the cooling flows and/or blocking flows in the hub region each have, as a rule, different flow angles and flow velocities in comparison to the main flow, as a result of which, in the case of the flows that are responsible for the wall losses, undesired flow effects that are subject to loss can ensue.

In each case, the flow velocity of the leakage flows is equal to zero at the surface of the delimiting walls; that is, in the absolute system, a fluid particle that is situated directly at the stator wall has a velocity equal to zero and a fluid particle at the rotor has the local peripheral velocity. In between, a statically nearly linear velocity distribution is formed. The leakage flows occurring in the (main) flow channel are therefore subject to vortices and, on average, have a peripheral component of the absolute velocity that corresponds to about half of the peripheral velocity. The generation of this vortex flow causes losses.

In the edge region of the (main) flow channel, an incorrect flow direction of the leakage flow and of the blocking flow and/or cooling flow can cause an incorrect inflow to the row of vanes or blades that follow downstream. This leads, as a rule, to a suction-side impingement of the edge flow on the following row of blades or vanes and, in the (main) flow channel, can lead to separations and the formation of secondary flows, which, in the region of the blade or vane element end, move in the direction of the suction side. As a rule, this results in the occurrence of further losses.

By use of an additional first guide profile according to the invention, it is possible, in particular, to influence the flow in the region of the associated blade or vane element end, in particular in the edge region of the blade or vane element and/or in the edge region of the flow channel and/or in the region of a delimiting wall of the flow channel. In this way, it is possible, in particular, to influence the occurrence of gap flows and/or leakage flows and/or the occurrence of boundary layer flows, above all the direction thereof, in a manner that is efficient and saves installation space. As a result of the first guide profile that, in particular, extends at least partly in the axial direction and at least partly in the peripheral direction, it is possible, if need be with the help of further profiles and/or by way of advantageous profile geometries of the blade or vane element profile and guide profile, to influence, in particular, the direction of any occurring gap flows and/or leakage flows and/or any occurring boundary layer flows in such a way that, upon entry of the flow into the following row of blades or vanes, it is possible to achieve a direction and a velocity that are better matched to the main flow, as a result of which, when main flows and gap flows and/or leakage flows and/or boundary layer flows impinge on one another in the following row of blades or vanes, the occurrence of losses can be reduced.

For an appropriate design of the blade or vane, in particular of the first guide profile, it is possible in some embodiments of the present invention to achieve, in particular, that any occurring gap flows and/or leakage flows and/or boundary layer flows during impingement with the main flow have primarily and/or nearly, in particular exactly, the direction of the main flow.

In an embodiment of the present invention, in particular, at least one first guide profile of the blade or vane extends from the suction side and/or the pressure side of the blade or vane element, in particular, at least partly in the peripheral direction, particularly in the peripheral direction.

In this way, it is possible to achieve an especially advantageous influencing of the interfering loss flows.

In particular, the first guide profile is plate-like or flat in design and, in particular, is designed like a partition wall, whereby the first guide profile can have, in particular, a constant wall thickness or else a wall thickness that changes in the peripheral direction and/or in the axial direction. A guide profile of this kind makes possible an especially advantageous influencing of the flow. In particular, it is possible in this way to separate the flow in the flow channel in a simple way, at least partially, into a main flow and an edge flow. This makes possible, in particular, a specific, separate influencing of the main flow and/or the edge flow, in particular a specific influencing of the edge flow, as a result of which, for an appropriate design of the respective profiles, flow losses can be reduced. Furthermore, a guide profile of this kind makes it possible to provide a simply designed blade or vane as well as to manufacture it or a blade or vane segment, in particular a blade or vane with a first guide profile, in a simple manner.

In an embodiment of the present invention, the blade or vane has, in particular, at least one wall segment that delimits a flow channel and is joined to the blade or vane, in particular to a blade or vane element end, particularly a shroud segment or a ring segment, in particular an inner shroud segment and/or an outer shroud segment, wherein at least one first, in particular additional, guide profile is arranged spaced apart from the wall segment in the radial direction, particularly inward in the radial direction, and extends, in particular in the peripheral direction, particularly in at least one radial plane, at least partly parallel to the wall segment and/or is formed and is arranged concentrically to the wall segment.

That is, in an embodiment of the present invention, the first guide profile and a wall segment, for example a shroud segment or a ring segment, delimit in the radial direction, at least partly and preferably completely, an edge-side flow channel (secondary flow channel). In this case, the first guide profile can be designed, in particular, in such a way that, with the associated wall segment, it delimits the edge-side flow channel (secondary flow channel) at least partly in such a way that, in at least one radial plane, the distance between the wall segment and the first guide profile in the radial direction is constant in the peripheral direction at least over a part of the periphery.

In this way, it is possible to achieve an especially advantageous influencing of the flow, in particular an efficient diversion in the region of the blade or vane element end.

In an embodiment of the present invention, the first guide profile is, in particular, designed to be parallel and/or concentric to a shroud segment or a ring segment of the blade or vane in at least one radial plane, preferably parallel to an inner shroud or ring segment in the region of the inner blade or vane element end and preferably parallel to an outer shroud in the region of the outer blade or vane element end.

In this way, it is possible to achieve an especially advantageous influencing of the flow.

In an embodiment of the present invention, the first guide profile and a wall segment are designed, in particular, in such a way that an edge-side flow channel (secondary flow channel) that is delimited at least partly and preferably completely by them in the radial direction has a cross section that tapers in the axial direction in the flow direction, wherein, in particular, in this case, at least in at least one radial plane and at least over a part of the periphery, the edge-side flow channel has a constant cross section in the peripheral direction.

In this way, it is possible to achieve an especially advantageous influencing of the edge flow.

In an embodiment of the present invention, the blade or vane has at least one first guide profile, which is arranged in the region of the inner blade or vane element end, in particular on a radially outer side of the inner shroud or ring segment of an inner ring and is radially spaced apart from the inner shroud or the ring segment of the inner ring, wherein, in particular, in this case, the first guide profile forms, together with the inner shroud or the ring segment, a secondary flow channel, and forms a main flow channel together with a further, in particular outer, delimiting wall, in particular together with a first guide profile that is arranged in the region of an end section of the outer blade or vane element end or an outer shroud.

In this way, it is possible to achieve an especially advantageous influencing of the flow, in particular of the flow subject to loss, particularly of the direction thereof.

In an alternative or additional embodiment of the present invention, the blade or vane has at least one first guide profile, which is arranged in the region of the outer blade or vane element end, in particular on a radially inner side of an outer shroud and radially spaced apart from the outer shroud, wherein, in particular, the first guide profile forms here, together with the outer shroud, a secondary flow channel, and forms a main flow channel together with a further, in particular inner, delimiting wall, particularly together with a first guide profile that is arranged in the region of an end section of the inner blade or vane element end or an inner shroud.

In this way, it is possible to achieve an especially advantageous influencing of the flow, in particular of the flow subject to loss, particularly the direction thereof.

In an embodiment of the present invention, the blade or vane element profile has a main flow section with a main profile and a main profile geometry and at least one secondary section with a secondary profile and a secondary profile geometry, in particular at least one end section, particularly an end section in the region of the radially inner end of the blade or vane element or in the region of the radially outer end of the blade or vane element, wherein the secondary section extends, in particular, from the main flow section to the associated blade or vane element end.

In an embodiment of the present invention, at least one first, additional guide profile is arranged in the radial direction in the transition region from the main flow section into the secondary flow section and extends, in particular at this height, at least partly in the peripheral direction and/or at least partly in the tangential direction, in particular starting from the suction side and/or the pressure side of the blade or vane element.

In this case, the secondary profile can extend in the radial direction, at least partly or completely, in extension from the main profile. Alternatively, however, the secondary profile can also be arranged in the peripheral direction displaced with respect to the main profile.

Through an arrangement in extension from the main profile, it is possible, as a rule, to achieve a better transfer of force into an associated shroud or into a blade or vane root.

In an embodiment of the present invention, the secondary profile has at least one secondary section, in particular at least at the associated blade or vane element end, which has at least partly, preferably completely, a secondary profile geometry that is identical to the main profile geometry.

In another, alternative embodiment of a blade or vane according to the present invention, the secondary profile has at least one secondary section, in particular at least at the associated blade or vane element end, which has at least partly, preferably completely, a secondary profile geometry that is different from the main profile geometry, in particular different from the main profile geometry in the region of the main flow section that adjoins the secondary section and/or different from the main profile geometry at the other blade or vane element end.

In this way, it is possible to achieve an especially advantageous influencing of the flow.

In an embodiment of the present invention, in the region of its main flow section, in particular at least in the region of its profile leading edge, in particular over an entire profile length, that is, along the entire profile centerline in the flow direction, the blade or vane element, in particular the blade or vane element profile, has a main profile with a convexly curved suction side and a concavely curved pressure side; that is, the profile leading edge is curved toward or is directed toward the pressure side.

In this way, it is possible to achieve an advantageous flow in the main flow section.

In an embodiment of the present invention, the at least one secondary profile here preferably has, in particular, at least starting from a profile center in the flow direction, that is, at least starting from half the length of an associated profile centerline or midline, a curvature that is analogous in form to that of the associated main profile section. In particular, starting from the profile center in each case, the side situated on the suction side of the main profile section is convexly curved and, starting from the profile center in the flow direction, the side that is situated on the pressure side of the main profile section is concavely curved.

In this way, it is possible to achieve an especially good approach to the direction of the main flow in the region of the trailing edge of the blade or vane element and, as a consequence thereof, an improved inflow to a following row of blades or vanes.

In an embodiment of the present invention, the secondary profile of at least one secondary section has a profile leading edge that is curved toward the suction side of the associated main profile section or is arranged displaced in the direction thereof and/or has an S-twist in the flow direction.

In an embodiment of the present invention, the secondary profile of the at least one secondary section has, in particular in the region of its profile leading edge or inflow edge, a profile nose that is rotated toward the suction side and, in particular is concavely curved in the region of the suction side (in relation to the suction side of the main profile), while it is convexly curved in the region of the pressure side D (in relation to the pressure side of the main profile).

In an embodiment of the present invention, in particular at least in a front region that adjoins the profile leading edge, in particular in the flow direction up to the profile center, the secondary profile of at least one secondary section has a concave curvature toward the suction side of the associated main profile section, in particular in association with a convex curvature starting at the profile center, and has a convex curvature toward the pressure side of the associated main profile section and/or an S-twist. In particular, in one embodiment of the present invention, the secondary profile is designed in such a way that a profile leading edge of the secondary profile is curved toward the suction side of the associated main profile section or is directed toward the suction side thereof.

In this way, it is possible to achieve an especially advantageous influencing of the flow. In particular, it is possible to achieve an advantageous diversion of interfering (edge) flows, in particular those subject to loss, and an approach to and/or a matching of the direction thereof to that of the main flow, as a result of which, in many cases, flow losses can be diminished. In particular, by means of a secondary profile that is designed in this way, it is possible to influence any edge flow that occurs, without a disadvantageous matching of the main profile.

In an embodiment of the present invention, the blade or vane, in particular the blade or vane element, has at least one second guide profile, in addition to the blade or vane element profile, in the region of the radially inner end of the blade or vane element and/or of the radially outer end of the blade or vane element, wherein the second guide profile extends at least partly in the axial direction, in particular in the axial direction, and at least partly in the radial direction, in particular in the radial direction, and, particularly in the peripheral direction, is arranged spaced apart from the blade or vane element profile, in particular spaced apart from the secondary profile in the peripheral direction.

In this way, it is possible to achieve an improved transfer of force, particularly to an associated shroud (segment) or to an associated inner ring or an associated inner ring segment and, in the case of rotating blades, to the blade root, in particular when the blade element has a secondary profile with a secondary profile geometry that deviates from that of the main profile.

In an embodiment of the present invention, at least one second guide profile extends in the radial direction, particularly at least partly, in particular completely, parallel to the secondary profile, in particular starting from at least one first guide profile, which extends at least partly in the peripheral direction and/or at least partly in the tangential direction and, in particular in the radial direction, and particularly up to nearly or completely up to the height of the associated end of the blade or vane element.

In this way, it is possible to achieve an especially advantageous influencing of the flow.

In an embodiment of the present invention, the additional second guide profile, which extends, in particular, in the radial direction, preferably is shorter in design in the axial direction, in particular markedly shorter, than the secondary profile or the main profile of the blade or vane element.

In an embodiment of the present invention, in particular the profile leading edge of at least one additional second guide profile, which, in particular, extends in the radial direction, and the profile leading edge of the blade or vane element profile, in particular of the secondary profile, are situated preferably at the same height in the axial direction.

Alternatively, the profile leading edge of the additional second guide profile, which, in particular, extends in the radial direction, can be situated in the axial direction, but also further upstream or further downstream.

In an embodiment of the present invention, the second guide profile has a profile leading edge that is arranged curved toward the suction side of the associated main profile section or is arranged displaced with respect to it, and/or an S-twist in the flow direction.

In an embodiment of the present invention, at least one second guide profile, in particular in the region of its profile leading edge or inflow edge, has a profile nose, which is rotated toward the suction side and, in particular, is concavely curved in the region of the suction side (in relation to the suction side of the main profile) and is convexly curved in the region of the pressure side D (in relation to the pressure side of the main profile).

In an embodiment of the present invention, the second guide profile, which, in particular, extends in the radial direction, has a concave curvature toward the suction side of the associated main profile section, at least in a front region that adjoins its profile leading edge, in particular in the flow direction up to at least the profile center, particularly over its entire profile length in the radial direction, in particular in connection with a convex curvature starting at the profile center, and has a convex curvature toward the pressure side of the associated main profile section, and/or an S-twist. In particular, in an embodiment of the present invention, the second guide profile is designed in such a way that a profile leading edge of the second guide profile is curved toward the suction side of the associated main profile section or is pointed toward the suction side thereof.

In this way, it is possible to achieve an especially advantageous influencing of the flow, in particular of the leakage flows, the blocking flows, the cooling flows, and/or the boundary layer flows that occur in the region of the end of the blade or vane element.

In an embodiment of the present invention, a blade or vane has, in particular, a secondary profile and/or one first guide profile or a plurality of first guide profiles and/or one second guide profile or a plurality of second guide profiles or no second guide profile.

In an embodiment of the present invention, the profile or the profile section or the profiles or profile sections associated with the blade or vane in the end region of the blade or vane, in particular in a secondary section and/or in a region provided as a secondary channel, is or are designed, in particular, for the purpose of creating with the profile or profiles of at least one neighbor blade or vane (in relation to a functional installed state or state of use of the blade(s) or vane(s)) a defined flow profile, in particular one individual channel or a plurality of individual channels and/or "sub-channels" inside of the secondary channel.

In particular, the profile and/or the profile section or the profiles and/or the profile sections associated with a blade or vane in the end region of the blade or vane is or are designed for the purpose of creating a flow profile, by means of which flow losses in the near-wall region, in particular boundary layer flow losses, can be reduced.

In an embodiment of the present invention, a profile geometry of at least one secondary profile and/or at least one guide profile in the secondary channel is matched in the inlet region to the direction of a boundary flow and leakage flow and is matched in the outlet region to the direction of the main flow, in particular to a mean direction of the resulting boundary flow and leakage flow and/or to a mean resulting main flow direction.

In particular, at least one secondary profile and/or at least one second guide profile is designed in such a way that, in the inlet region to the secondary channel, the inflow can occur as optimally as possible, in particular with as little flow resistance as possible. That is, the respective profile in the inlet region to the secondary channel is matched, in particular, to the direction of the boundary flow and leakage flow, whereby, for this purpose, in particular, the respective profile leading edge is aligned to a resulting direction of the boundary flow and leakage flow, in particular to the mean resulting direction.

In the outlet region, in contrast, in particular, at least one secondary profile and/or at least one second guide profile is designed in such a way that the flow in the secondary channel is influenced in such a way that it exits from the secondary channel with a similar or identical direction to a parallel, in particular mean, main flow from the main channel.

For this purpose, in an embodiment of the present invention, the blade or vane in the secondary section, in particular, has a profile geometry that is adapted to the profile geometry of at least one main profile in the associated outlet region in the main section, particularly a similar or identical profile geometry.

In an embodiment of the present invention, a blade or vane segment for a turbomachine, in particular a rotating blade segment or a guide vane segment, particularly for a gas turbine, in particular for a turbine stage of a gas turbine, particularly for a low-pressure turbine or for a high-pressure turbine, has at least one first wall segment that delimits a flow channel, in particular a shroud segment or a ring segment, and at least one blade or vane that has a blade or vane element with a blade or vane element profile and a radially inner end of the blade or vane element and a radially outer end of the blade or vane element, wherein the radially inner end of the blade or vane element or the radially outer end of the blade or vane element is joined to the first wall segment.

In accordance with the invention, the blade or vane segment, in particular the blade or vane, the blade or vane element, and/or the wall segment, has, in addition to the blade or vane element profile, at least one first guide profile that is arranged in the region of at least one radially inner end of the blade or vane element and/or radially outer end of the blade or vane element and is spaced apart from the associated blade or vane element end in the radial direction and extends at least partly in the axial direction, in particular in the axial direction, and at least partly in the peripheral direction, and/or at least partly in the tangential direction, in particular in the peripheral direction and/or in particular in the tangential direction.

By means of a blade or vane segment according to the invention, it is possible in a simple way to provide an improved, in particular efficiency-optimized, turbomachine.

In an embodiment of the present invention, in particular at least one blade or vane element is tightly joined to a wall segment by a blade or vane element end, wherein the blade or vane element and the wall segment can also be formed in one piece.

Alternatively, the wall segment and at least one blade or vane element can also be formed in multiple parts. In particular, a wall segment can be a part of a shroud and/or of a shroud segment or a part of a blade or vane cascade or of a blade or vane cascade segment, in particular a part of an inner ring or inner ring segment or of an outer ring or outer ring segment.

In an embodiment of the present invention of a blade or vane segment, at least two first guide profiles of a blade or vane segment that extend in the peripheral direction abut each other in the peripheral direction and form a first guide profile section that extends in the peripheral direction, wherein, in particular, all first guide profiles form a common, in particular closed, first guide profile band segment that extends in the peripheral direction.

In this way, it is possible to achieve an especially efficient influencing of the flow, without the creation of further leakage flows. In particular, it is possible to achieve an especially good separation of the main flow and the secondary flow(s), in particular of the main flow and the edge flow, as a result of which an especially advantageous influencing of the respective flows is possible without greater disadvantages for the respective other flows. In this way, in particular, an especially advantageous, nearly separate influencing of the edge flow is possible.

In an embodiment of the present invention of a blade or vane segment, the blade or vane segment, in particular the blade or vane and/or the wall segment, has, in addition to the blade or vane element profile, at least one second, additional guide profile in the region of at least one radially inner end of the blade or vane element and/or radially outer end of the blade or vane element, wherein the second guide profile extends at least partly in the axial direction, in particular in the axial direction, and at least partly in the radial direction, in particular in the radial direction, and, in particular, is arranged spaced part from the blade or vane element profile in the peripheral direction.

In an embodiment of the invention, the first guide profile and/or the second guide profile is or are designed, in particular, in one piece with the blade or vane, in particular in one piece with the blade or vane element and/or with a wall segment.

Alternatively, the first guide profile and/or the second guide profile can each be designed as a separate component or as a separate assembly, which is coupled to the blade or vane, in particular to the blade or vane element, and/or to the wall segment, in particular being tightly joined in a functional installed state of a blade or vane segment according to the present invention in a turbomachine.

In an embodiment of the present invention of a blade or vane segment, the blade or vane segment has at least one blade or vane according to the invention.

In an embodiment of the present invention of a blade or vane segment, at least one second guide profile has a profile leading edge that is arranged curved toward the suction side of the associated main profile section or is arranged displaced in the direction thereof, and/or an S-twist in the flow direction.

In an embodiment of the present invention of a blade or vane segment, at least one second guide profile, which, in particular, extends in the radial direction, has, at least in a front region that adjoins its profile leading edge, a concave curvature toward the suction side of the associated main profile section, in particular in the flow direction up to at least the profile center, in particular over its entire profile length in the radial direction, in particular in connection with a convex curvature starting at the profile center, and has a convex curvature toward the pressure side of the associated main profile section, in particular before the profile center, and/or an S-twist. In particular, in an embodiment of the present invention, the second guide profile is designed in such a way that a profile leading edge of the second guide profile is curved toward the suction side of the associated main profile section or points toward the suction side thereof.

In an embodiment of an assembly according to the present invention for a turbomachine, in particular of a row of guide vanes or stator or of a row of rotating blades or rotor, particularly for a gas turbine, in particular for a turbine stage of a gas turbine, particularly for a low-pressure turbine or for a high-pressure turbine, the assembly has at least one blade or vane that is formed in accordance with the invention and/or at least one blade or vane segment that is formed in accordance with the invention.

A turbomachine according to the invention has at least one blade or vane that is formed in accordance with the invention and/or at least one blade or vane segment that is formed in accordance with the invention, and/or at least one assembly that is formed in accordance with the invention.

BRIEF DESCRIPTION OF THE DRAWING FIGURES

Other advantageous enhancements of the present invention ensue from the dependent claims and from the following description of preferred embodiments as well as from the associated figures. In the figures, functionally identical structural units or components are furnished with the same reference characters. In a partially schematic manner are:

Figure 2:
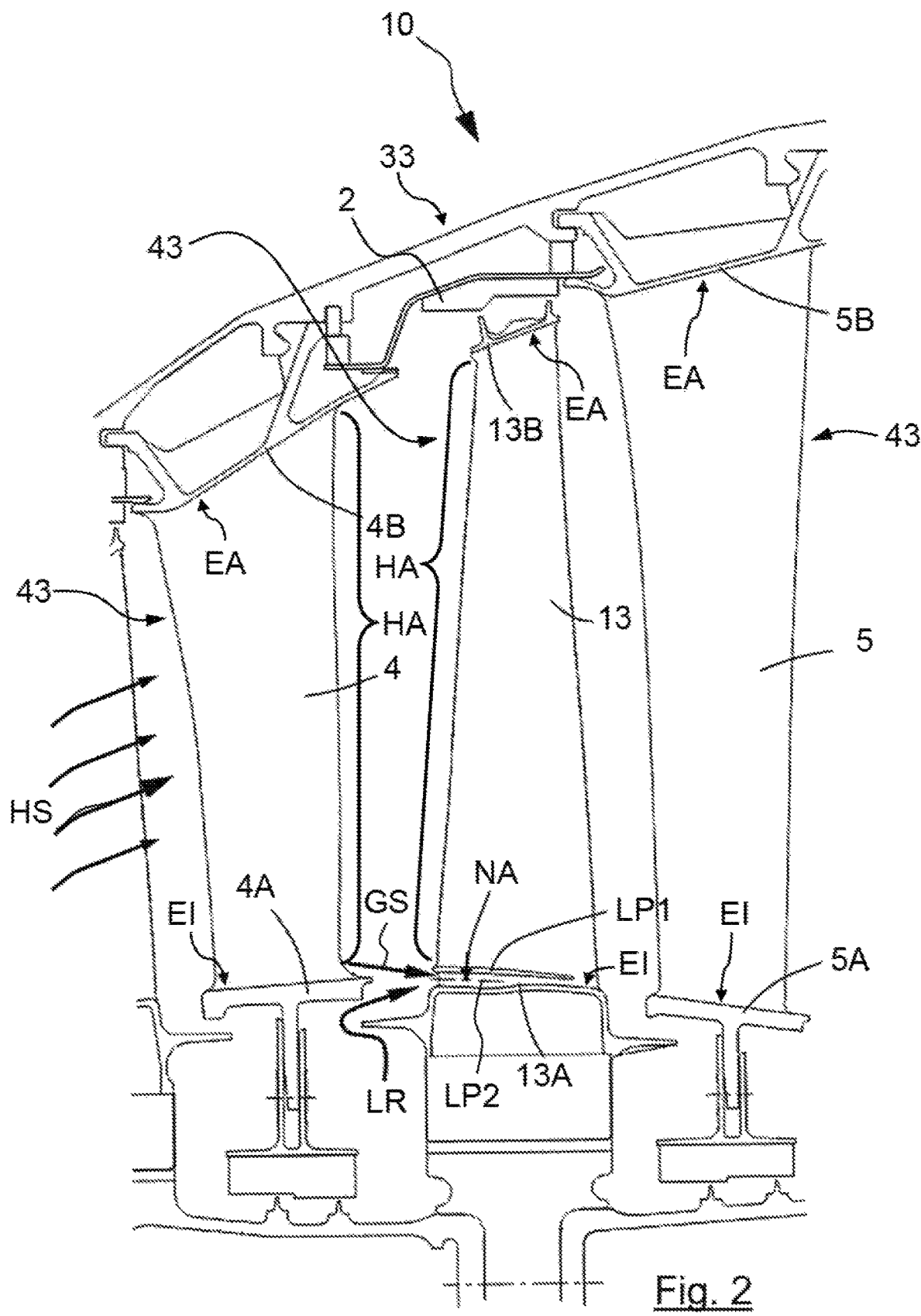
FIG. 2 shows an excerpt of a first exemplary embodiment of a turbomachine according to the invention in longitudinal section.
Figure 3:
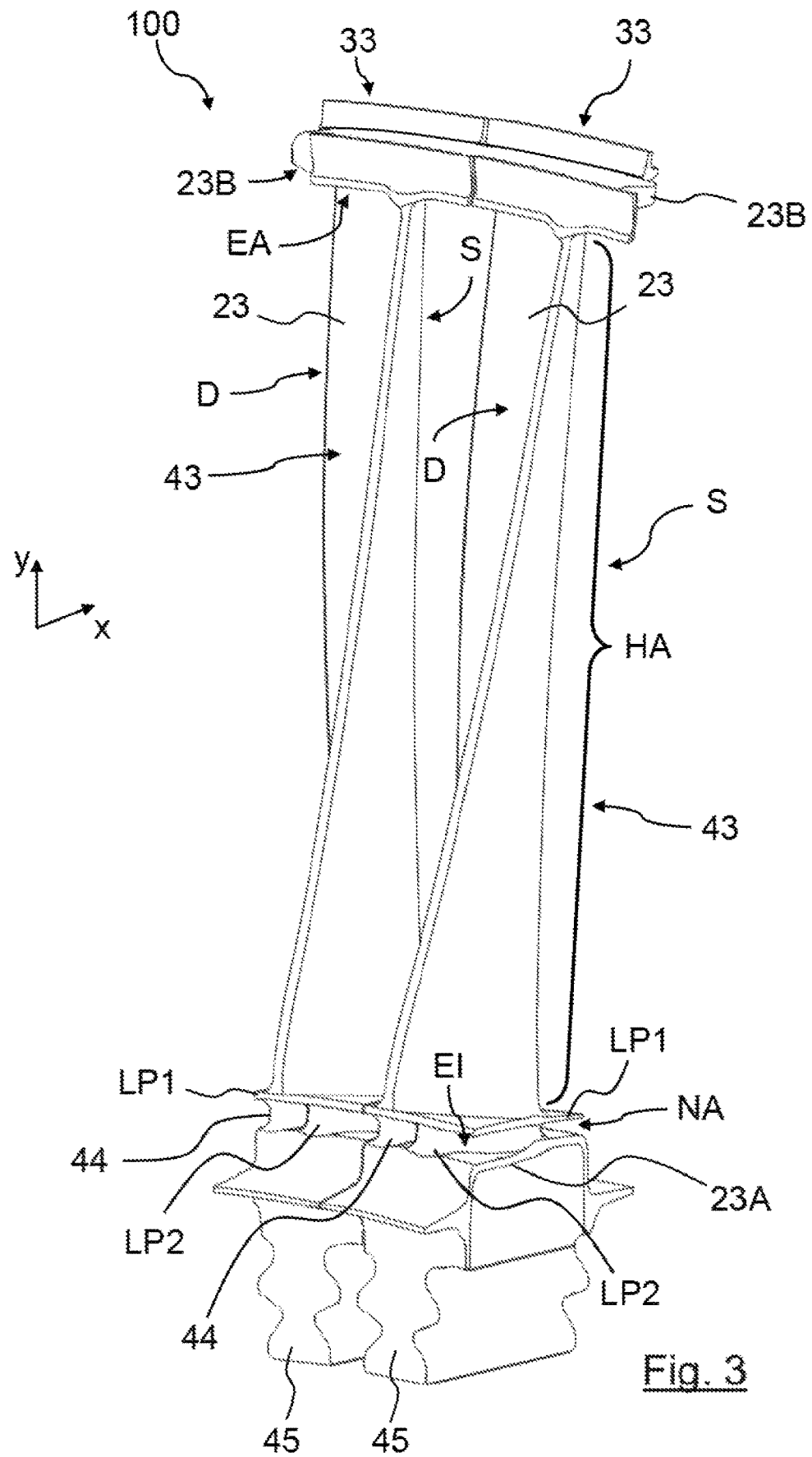
Figure 4:
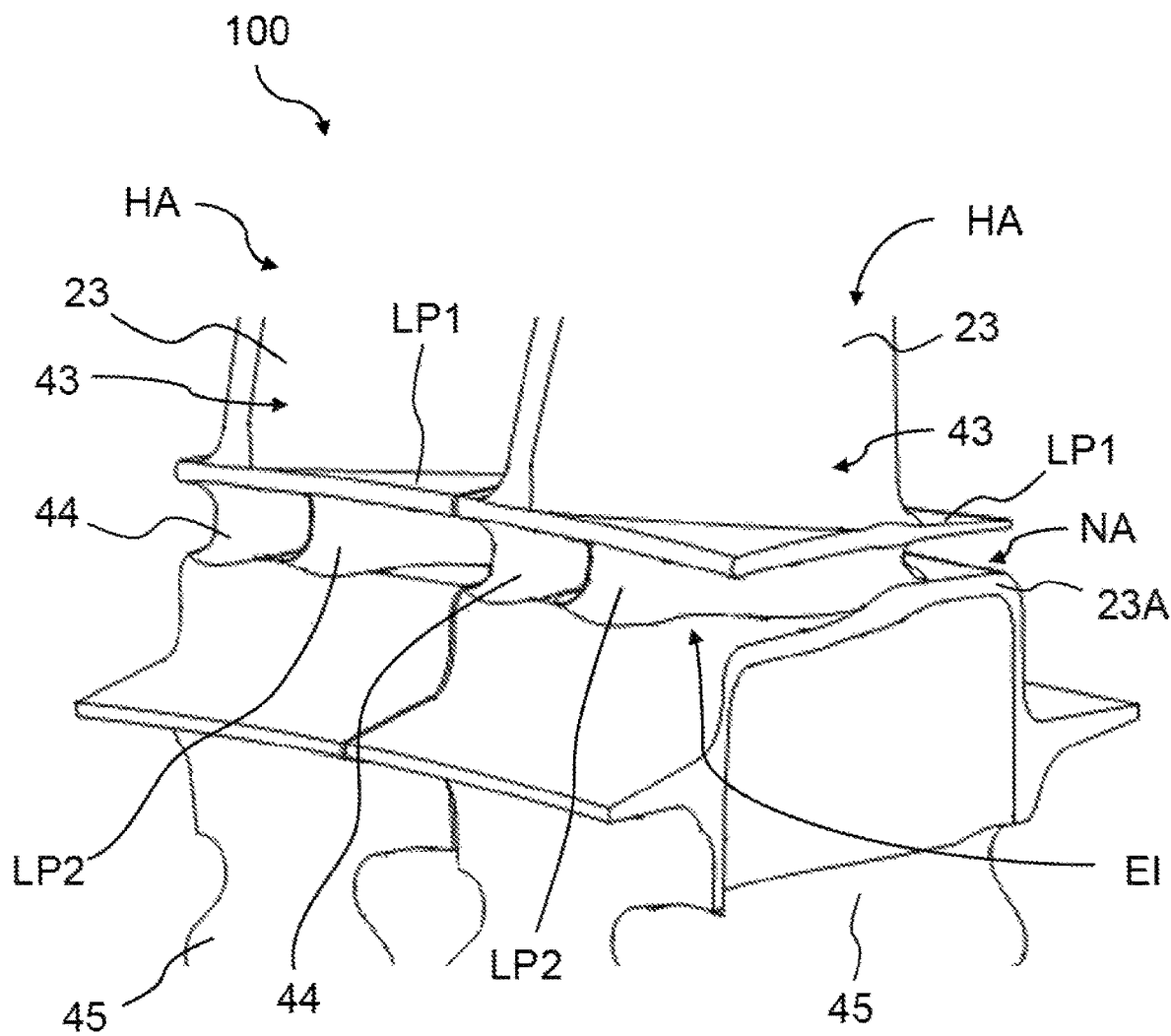
Figure 5:
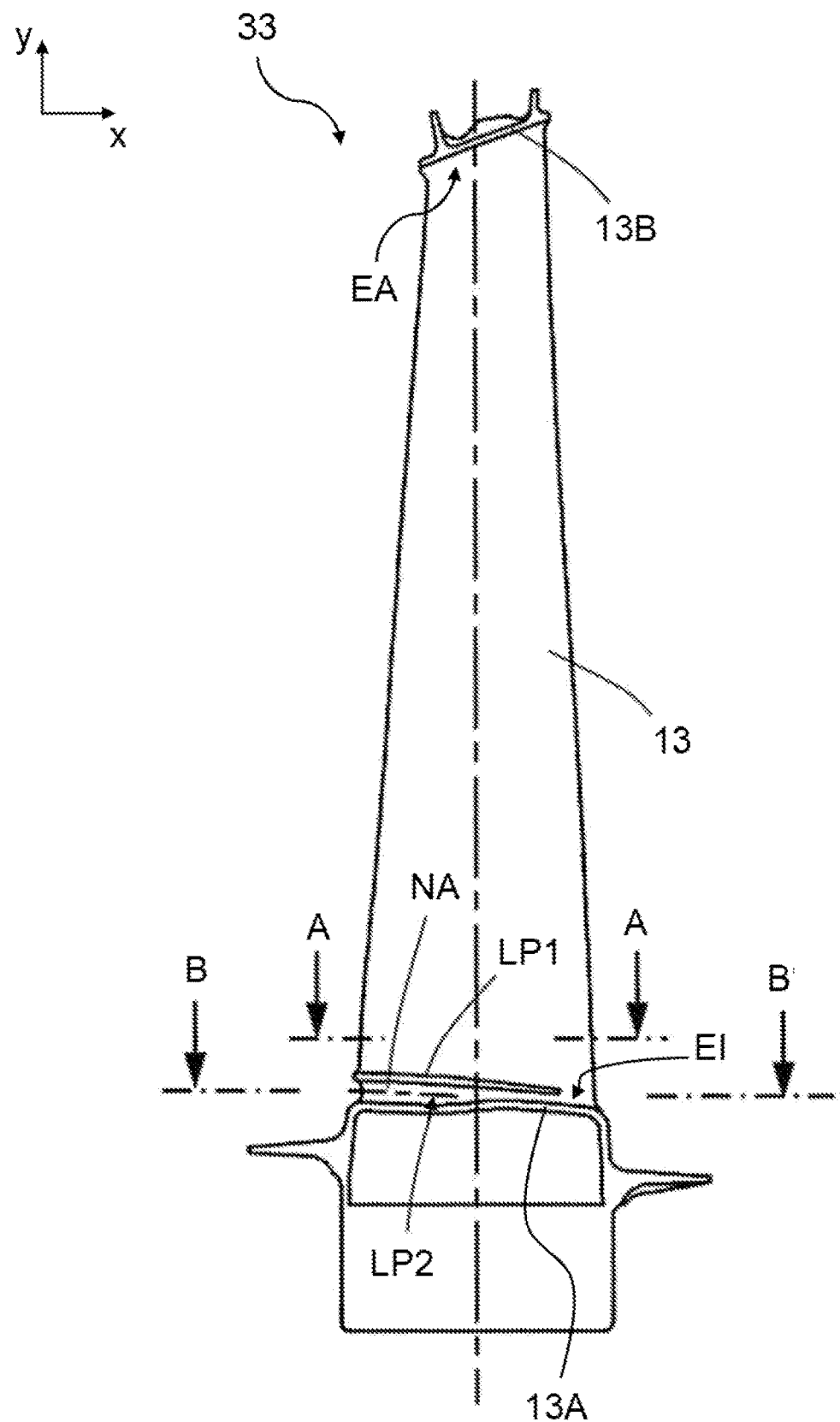
Figure 6:
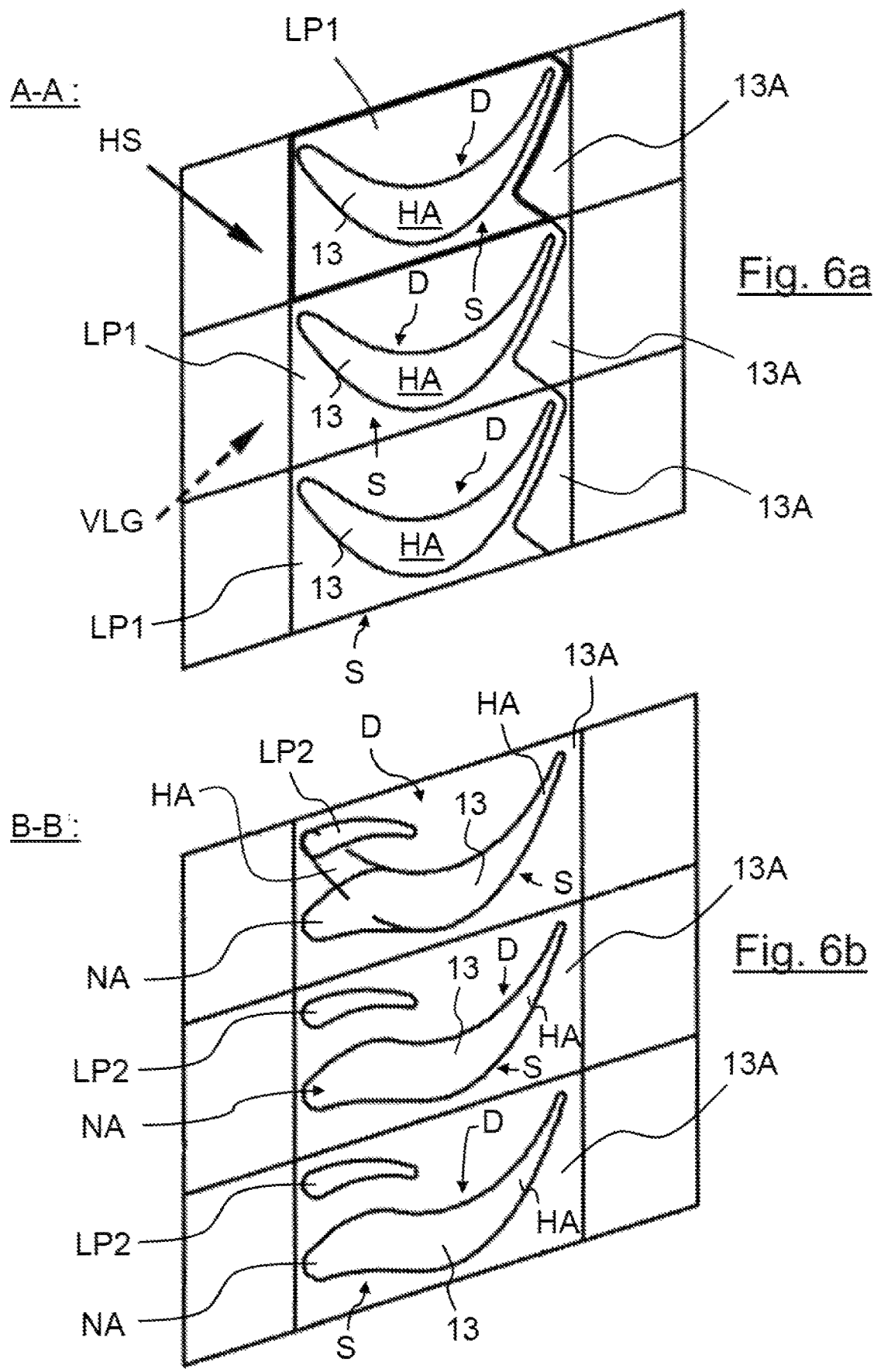
Figure 7:
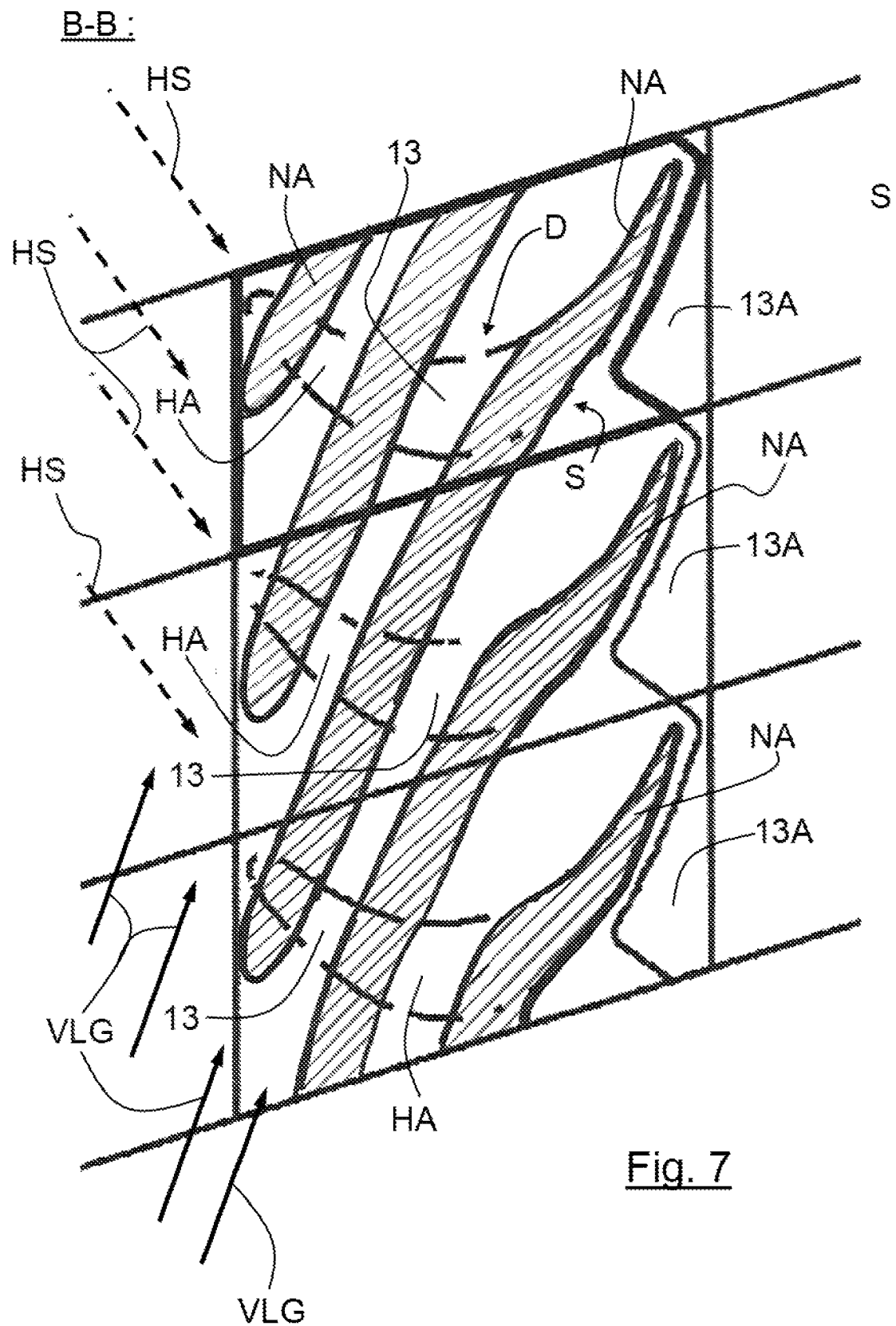
Figure 8:
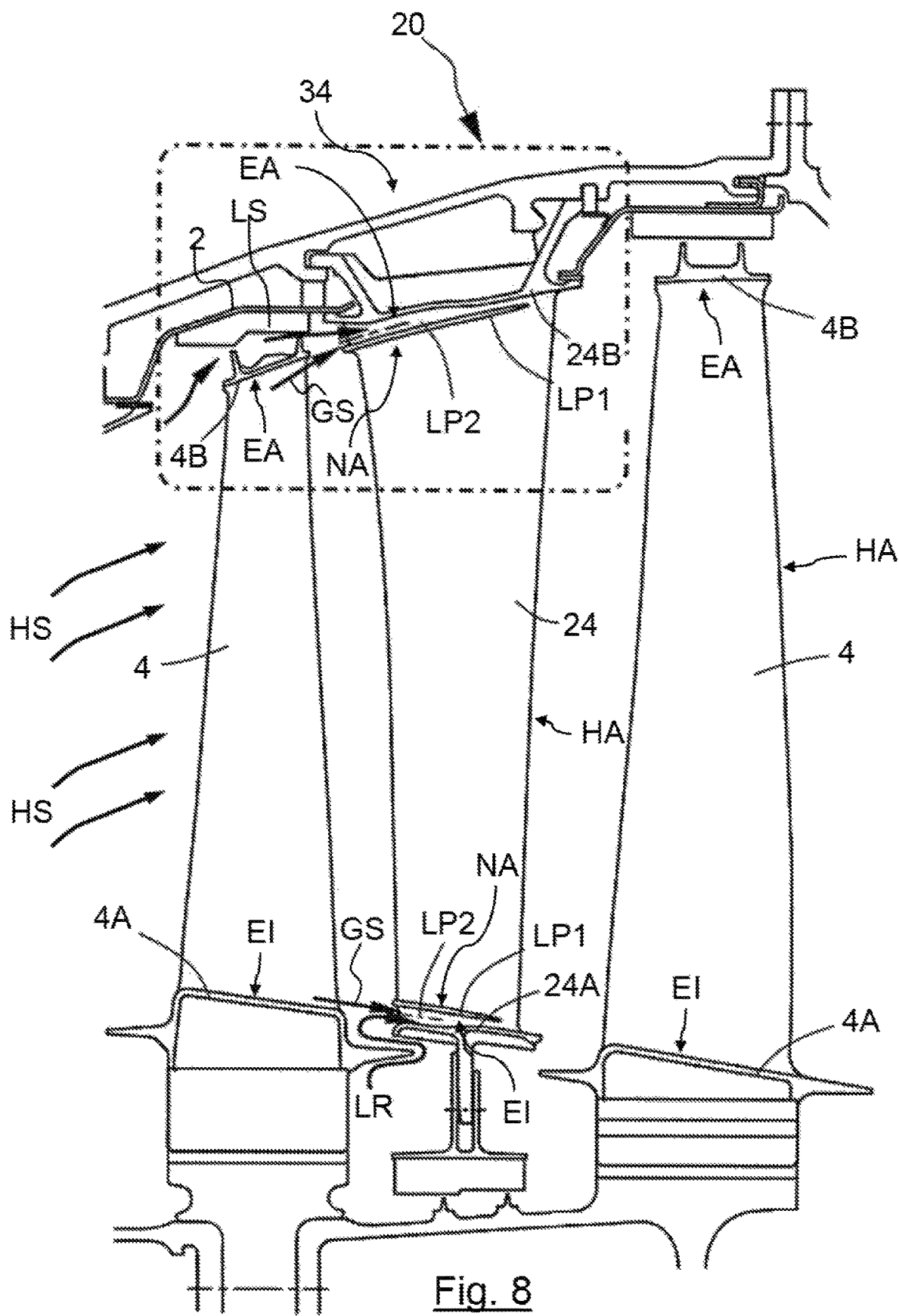
Figure 9:
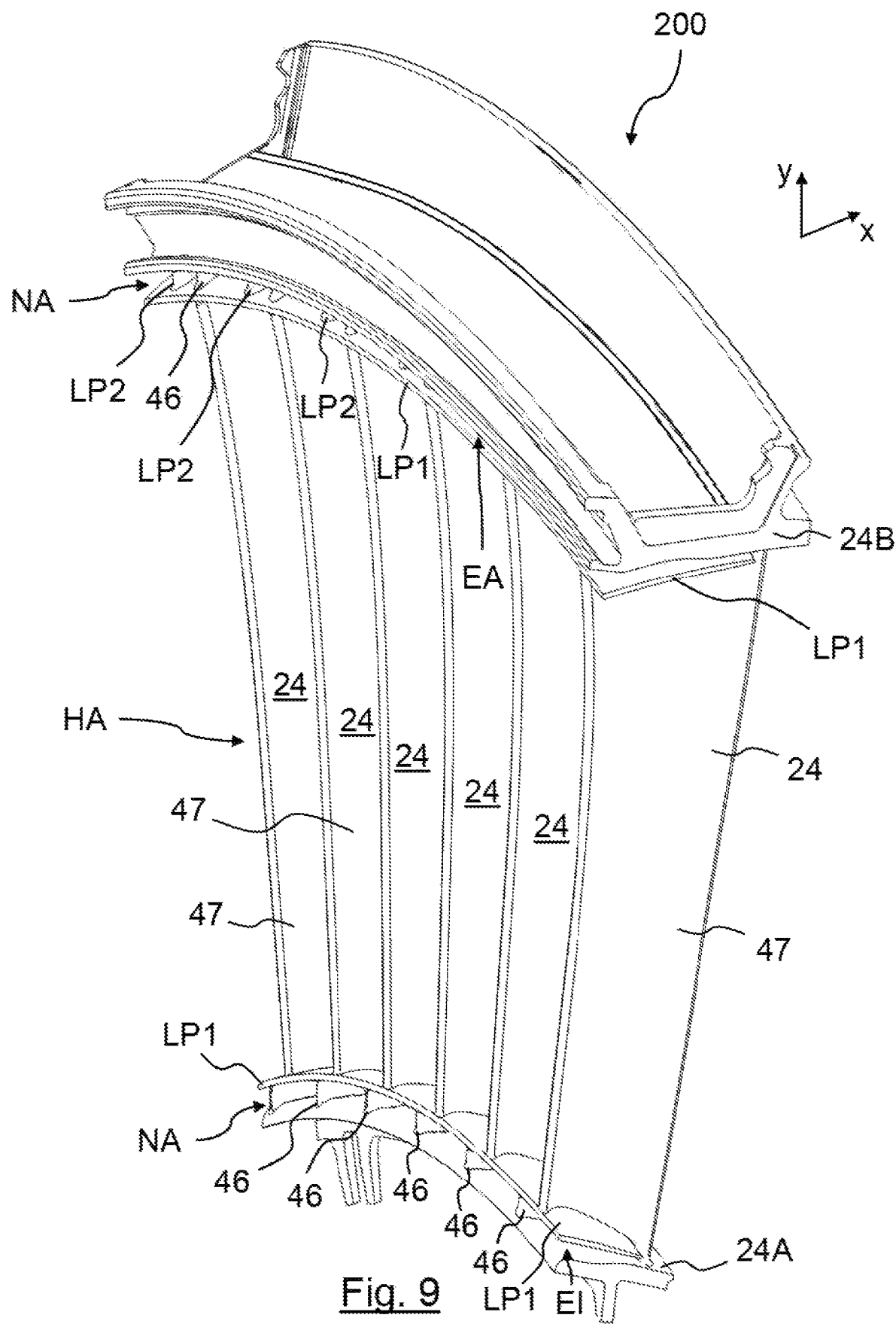
Figure 10:
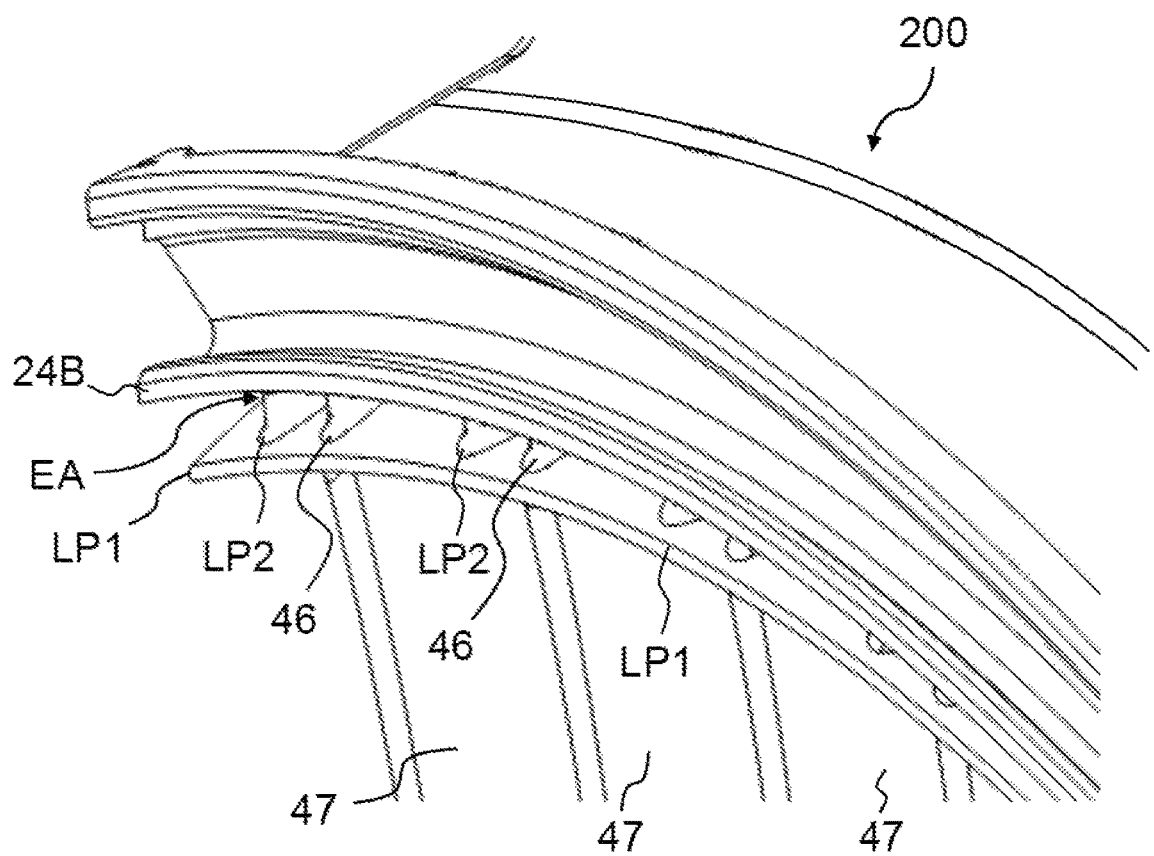
Figure 11:
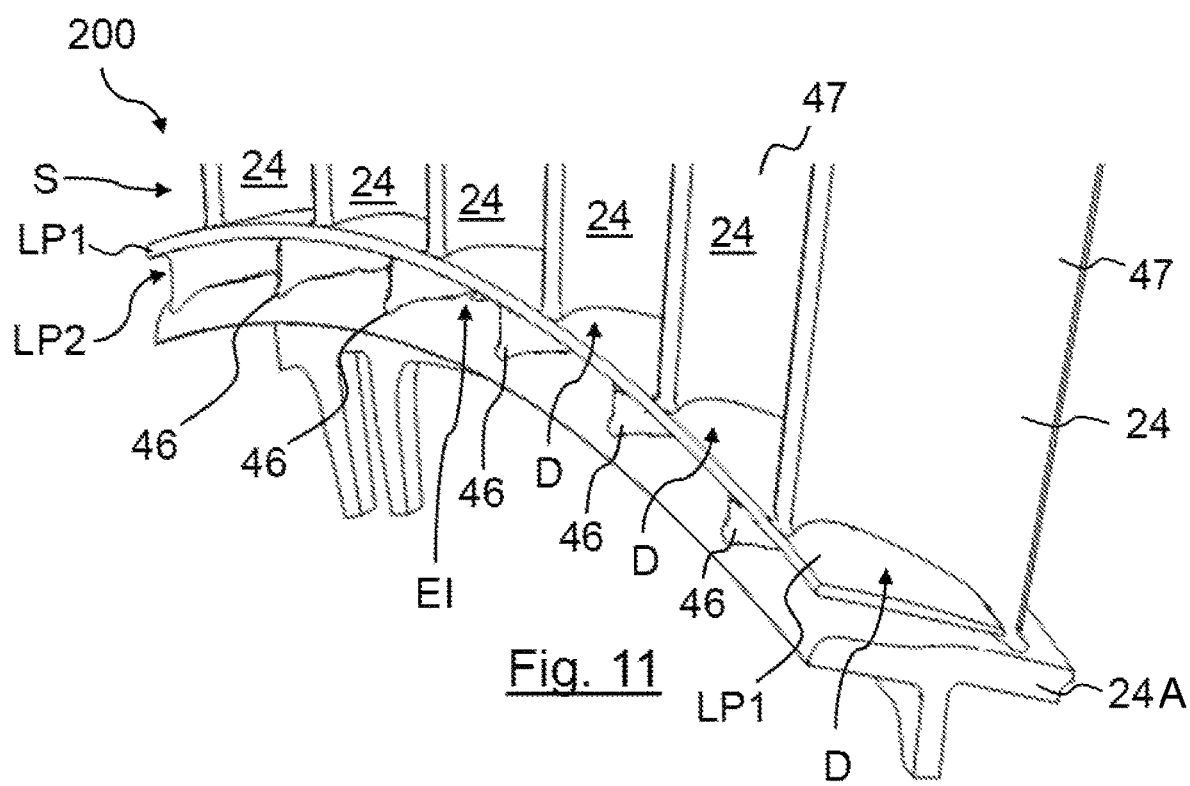
Figure 12:
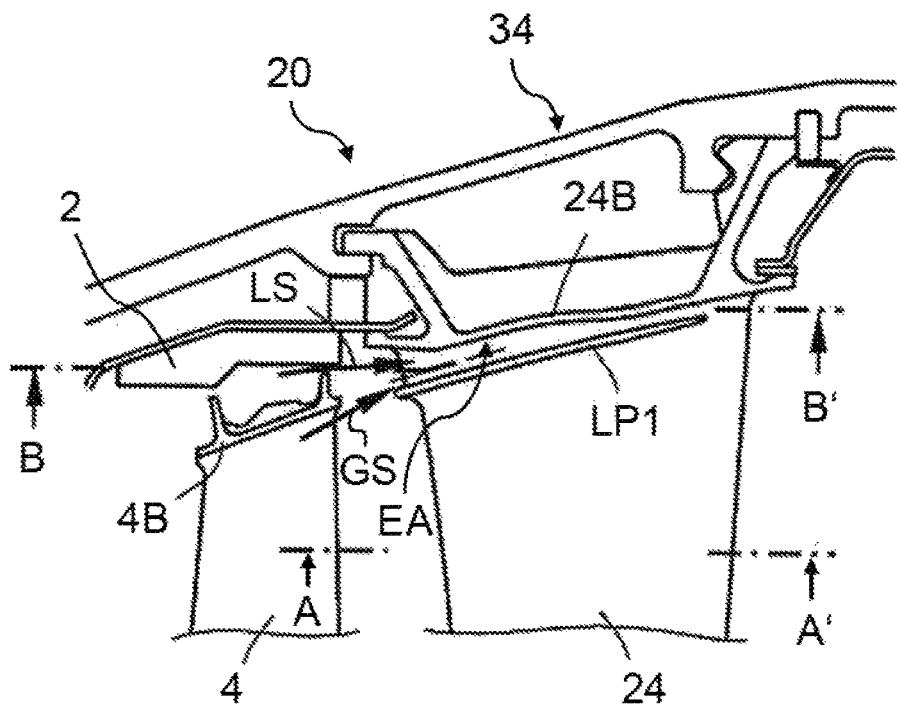
Figure 13A:
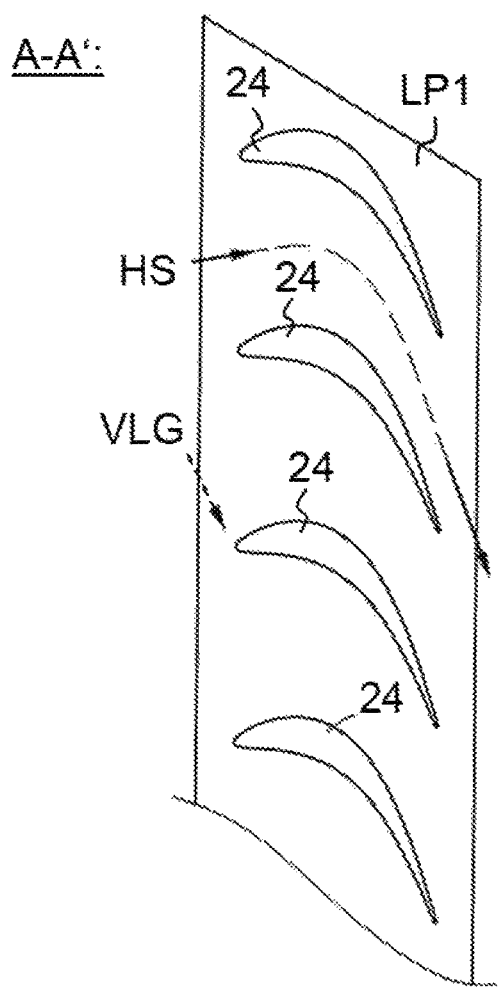
Figure 13B:
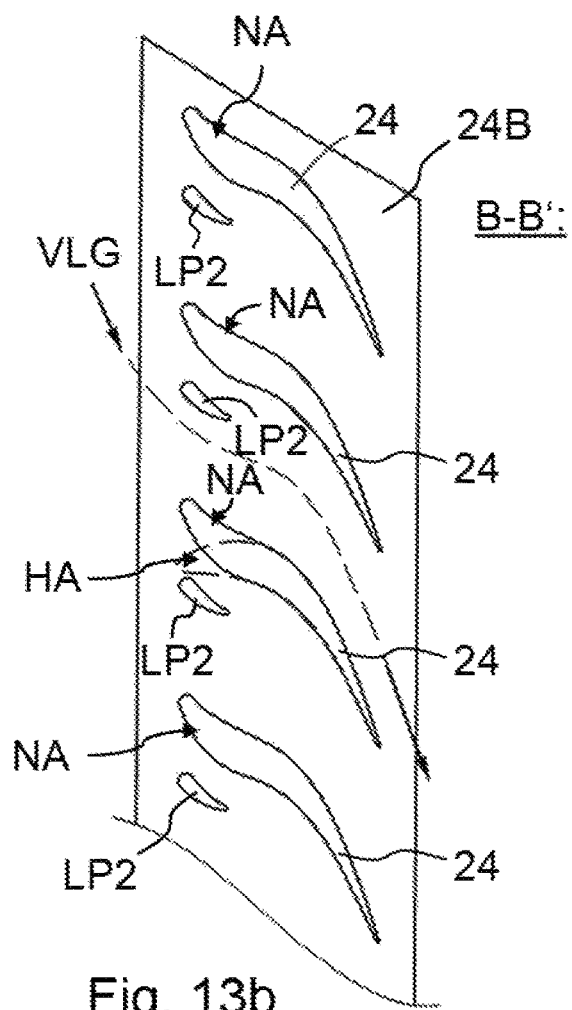

FIG. 3, in perspective illustration, shows two adjacently arranged rotating blades according to the invention for a first exemplary embodiment of an assembly according to the invention;

FIG. 4 shows an enlarged excerpt of the rotating blades from FIG. 3 in perspective illustration in the region of the radially inner blade element ends;

FIG. 5 shows one of the rotating blades according to the invention from FIG. 2 in an illustration of its individual parts in side view;

FIG. 6a shows an unwound section made along the sectional plane A-A through a plurality of individual, adjacently arranged rotating blades 33;

FIG. 6b shows an unwound section made along the sectional plane B-B through a plurality of individual, adjacently arranged rotating blades 33;

FIG. 7 shows an unwound section along a sectional plane B-B analogous to FIG. 6b through a plurality of individual, adjacently arranged rotating blades that have an alternative design in accordance with the invention;

FIG. 8 shows an excerpt of a second exemplary embodiment of a turbomachine according to the invention in longitudinal section;

FIG. 9 shows a guide vane segment according to the invention comprising the guide vanes according to the invention from FIG. 8 in perspective illustration;

FIG. 10 shows an enlarged excerpt in the region of the radially outer vane element ends of the guide vane segment according to the invention from FIG. 9;

FIG. 11 shows an enlarged excerpt of the guide vane segment according to the invention from FIG. 9 in the region of the radially inner vane element ends;

FIG. 12 shows an enlarged excerpt of the second exemplary embodiment of a turbomachine according to the invention in the region of the radially outer vane element end of the guide vane;

FIG. 13a shows an unwound section made through the vane elements of the guide vane segment according to the invention for the turbomachine according to the invention from FIG. 8 and FIG. 12 along the sectional plane A-A; and FIG. 13b shows an unwound section made through the vane elements of the guide vane segment according to the invention for the turbomachine according to the invention from FIG. 8 and FIG. 12 along the sectional plane B-B.

DESCRIPTION OF THE INVENTION

Figure 1:
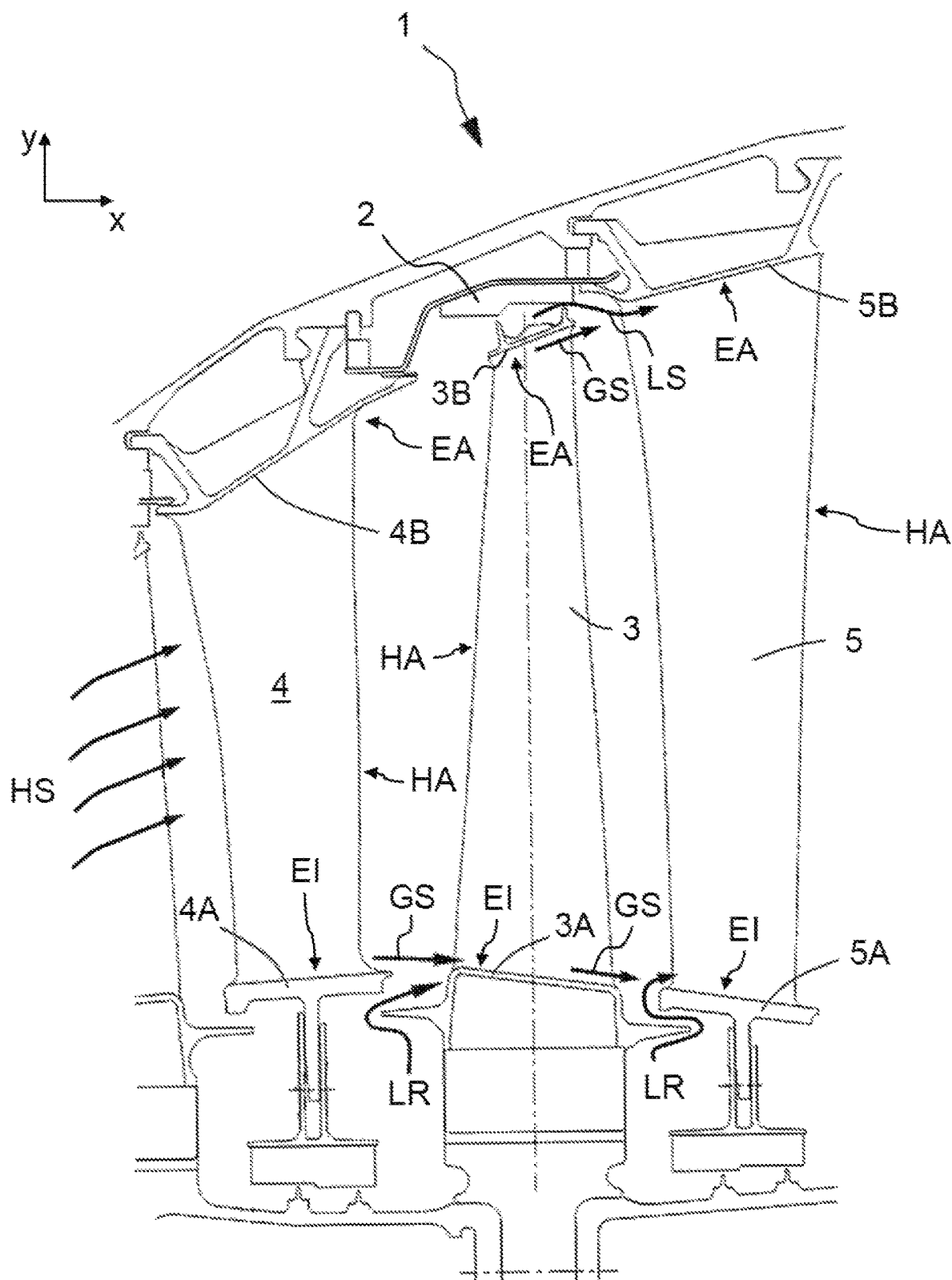
FIG. 1 shows an excerpt of a turbomachine known from the prior art.

FIG. 1 shows an excerpt of a turbomachine 1 known from the prior art in the form of an axial turbomachine 1 designed as a turbine, in particular as a gas turbine, which has a main flow channel that is designed for a main flow HS to flow through for the conversion of flow energy to mechanical energy. For the energy transformation of flow energy to mechanical energy, the turbomachine 1 has two stators, each of which has a row of guide vanes, which is not indicated here in greater detail. In this case, each row of guide vanes comprises a plurality of guide vanes that have vane elements 4 and 5 and are arranged uniformly distributed in the peripheral direction and that are fixed to a housing of the turbomachine 1, whereby, in each case, a plurality of guide vanes are combined in the peripheral direction to form a guide vane segment, which likewise is not indicated here in greater detail.

The guide vanes each have a vane element 4 or 5 with a vane element profile and, in each case, a vane element end EI, which lies radially further inward, and a vane element end EA, which lies further radially outward, whereby, in each case, the individual vane elements 4 and 5 are joined in one piece to one another by shrouds 4A and 4B as well as shrouds 5A and 5B, respectively, the shrouds extending in the peripheral direction and at least partly in the axial direction x. Here, a surface of the shrouds 4A, 4B as well as 5A and 5B that faces the vane elements 4 and 5, respectively, delimits the main flow channel in each case in the radial direction y, the main flow HS flowing through this flow channel in the axial direction through the turbomachine 1.

Via appropriately designed hook profiles, which are not indicated here in greater detail and which are each connected to the radially outer shrouds 4B and 5B, the individual guide vanes or guide vane segments are fixed in place in the housing of the turbomachine 1.

Arranged in the axial direction x between the two rows of guide vanes that are fixed to the housing and that comprise the guide vanes and vane elements 4 and 5 is a rotor or a row of rotating blades that comprise rotating blades with blade elements 3 that can rotate around a main machine axis, whereby the individual rotating blades, in particular the blade elements 3 thereof, likewise have a radially inner shroud 3A, which serves as a delimiting wall of the main flow channel, and a radially outer shroud 3B, which also serves as a delimiting wall of the main flow channel and extends at least partly in the peripheral direction and in the axial direction.

In this case, the rotating blades are fastened at their radially inner end at the rotor with the help of a blade root (45, compare FIG. 3), which is not indicated in greater detail here, and are mounted with respect to the housing by means of the rotor so as to rotate around the main machine axis.

In order to shield the hub region as much as possible against the high gas temperatures of the main flow HS in the main flow channel, the guide vanes and the rotating blades are designed in such a way, in particular in the region of their hub-side end, that they overlap at least partly geometrically in the axial direction regardless of the position of the rotor relative to the stator. Furthermore, for improvement of the shielding of the hub region, cooling air or blocking air LR is fed to the main flow channel from radially inward and can then flow around the above-described overlap of the guide vanes and the rotating blades in a labyrinth-like manner, as a result of which any leakage of hot gas out of the main flow channel in the direction of the rotor and hub is prevented or blocked.

The fluid flow LR introduced into the main flow channel in this way, which can be regarded as a leakage flow, can lead to an undesired influencing of the main flow and, in particular, may lead to undesired flow losses in the region of the associated blade or vane element end.

In the region of the radially outer end of the blade or vane EA, in particular in the region of the rotating blade tips of the rotating blade element 3, leakage flows LS are further formed, as a rule, during operation of the turbomachine 1. For reduction thereof, gas channel seals 2 are provided.

Owing to the gaps that are required in the region of the rotating blade tips for the requisite freedom of movement of the rotor in terms of its direction of rotation, hot gases, in particular, leak out of the main flow channel and, namely, do so via the gaps in back of the rotating blade, and can flow outside all the way between the guide vane tips and the gas channel seal 2 and then be fed back into the main flow HS in back of the rotating blade. In this case, when the leakage flows re-enter or are fed into the main flow HS, this may likewise result in an undesired influencing of the main flow HS and, in particular, to undesired flow effects that are subject to loss, such as separations, vortex formation, etc., and have a negative effect on the efficiency.

In the region of the shrouds 3A, 3B, 4A, 4B, and 5A, 5B, furthermore, the creation of boundary layer flows GS, which likewise have a flow direction that deviates from the main flow HS, may occur, this being indicated in FIG. 1, by way of example, only by the arrow symbols for the rotating blade in the middle. As a consequence, the boundary layer flows GS, which as such are always associated with loss, can lead to further flow losses, in particular on account of their flow direction, which deviates from the main flow direction HS, as in the case of the previously described leakage flows LS and LR, in particular to separations, vortexes or the like.

In this case, the ensuing flow losses are dependent, in particular, on how the main flow HS and the secondary flows, such as, for example, the leakage flows LR, LS or the boundary layer flows GS, differ in terms of direction and velocity.

FIG. 2 shows an excerpt of a first exemplary embodiment of a turbomachine 10 according to the invention in longitudinal section, whereby this turbomachine 10 is similar in construction to the turbomachine 1 that was described above and is known from the prior art, but differs in that the first turbomachine 10 according to the invention has a rotating blade 33 according to the invention with a blade element 13.

The rotating blade 33 according to the invention has a blade element profile as well as a radially inner blade element end EI and a radially outer blade element end EA, whereby, in each case, the rotating blade 33 has a radially inner shroud 13A as well as a radially outer shroud 13B, which delimit the main flow channel in the radial direction toward the inside as well as toward the outside.

In distinction to the rotating blade 3 described in connection with FIG. 1, the blade element 13 of the rotating blade 33 according to the invention has a main flow section HA and a secondary section NA in the region of the radially inner blade element end EI as well as a first guide profile LP1 that is present in addition to the main profile of the blade element 13 and extends at least partly in the axial direction x as well as in the peripheral direction, in particular, in each case, starting from the suction side S and the pressure side D, and forms, together with the inner shroud 13A, a secondary flow channel radially inside of the main flow channel.

Owing to the additional first guide profile LP1, the boundary layer flows GS and the leakage flows LR, which, in the region of the radially inner blade element end EI, impinge on the blade element 13 and cause losses, can be influenced, in particular, in such a way that their direction approaches that of the main flow HS and, in particular, can be matched to it.

In consequence thereof, the inflow to the guide vanes and, in particular, to the vane elements 5 thereof, which are arranged in the flow direction after the rotating blades 33 according to the invention, can occur in an advantageous way, in particular nearly in the main flow direction HS and not markedly deviating from it. As a result, the risk of incorrect flows can be reduced and, in consequence thereof, the occurrence of flow losses can be reduced.

Besides the first additional guide profile LP1, which, in particular, extends largely in the axial direction x as well as in the peripheral direction, a second additional guide profile LP2, which is only indicated here and likewise extends at least partly in the axial direction and extends in the radial direction y, in particular parallel to a section of the blade element 13 in extension of the main flow section HA (compare FIG. 3).

FIG. 3 shows, in perspective illustration, two adjacently arranged rotating blades 33 according to the invention for a first exemplary embodiment of an assembly 100 according to the invention, and FIG. 4 shows an associated enlarged excerpt of the rotating blades 33 from FIG. 3 in perspective illustration in the region of the radially inner blade element ends EI, whereby the two rotating blades 33, as in the case of the previously described rotating blade 33 according to the invention, each have a blade element profile with a radially inner blade element end EI and a radially outer blade element end EA, whereby, in each case, the blade element 23 has a part with a main profile 43, which forms the main flow section HA, and a secondary section NA in the region of the radially inner blade element end EI. In each case, the main profile 43 also has a suction side S and a pressure side D.

In this case, the main flow section HA serves primarily for conversion to mechanical energy of the energy of the mechanical fluid that flows past the rotating blades 33 or the blade elements 23 or vice versa, whereas the secondary section NA serves, in particular, for influencing the flow in the region of the radially inner blade element end EI of the rotating blades 33.

Clearly seen in this illustration, in particular, is the first additional guide profile LP1, which extends in the axial direction x and in the peripheral direction and, in this exemplary embodiment, divides, in particular, the blade element profile into the main flow section HA and the secondary section NA.

Furthermore, it can clearly be seen on the basis of this illustration that the additional guide profiles LP1 of the two rotating blades 33 abut each other directly and create a common guide profile band.

Clearly seen in this illustration, furthermore, is the secondary (flow) channel that is created by the first guide profiles LP1 together with the inner shroud segments 23A in the region of the radially inner rotating blade element end EI. Further seen in this illustration are the different profile geometries in the region of the main flow section HA and in the secondary section NA, whereby, in each case, the rotating blades 33 have a main profile 43 and a secondary profile 44 as well as first guide profiles LP1 and second guide profiles LP2. In this exemplary embodiment, the secondary profiles 44 of the rotating blades 33 form here, together with the second guide profiles LP2, the flow profile in the secondary channel, which, among other things, is delimited by the inner shroud segments 23A and the first guide profiles LP1. The individual secondary channel profiles associated with a blade 33, which, in this case, are a secondary profile 44 as well as a second guide profile LP2 in each case, thereby form, in particular in interaction with the respective secondary channel profiles 44 and the second guide profiles LP2 of the neighbor blades, a desired and defined flow profile, in particular a defined individual channel or a plurality of defined individual channels and/or "subchannels" inside of the secondary channels, around which a flow occurs during operation of the associated turbines, in particular around which the boundary flows and leakage flows LR, GS occur. In contrast, solely one shroud 23B is provided in the region of the radially outer blade element end EA in this exemplary embodiment. Going beyond this, however, specific measures for influencing the flow, in particular for influencing boundary layer flows and/or leakage flows, are not provided in the region around the outer shroud 23B. The (additional) arrangement of first guide profiles LP1 and/or of second guide profiles LP2 is conceivable, however, and appears to be advantageous in several cases of application.

In relation to a radial direction y, the blade element 23 has a secondary profile 44, which extends in the radial direction y from the inner shroud 23A to the first guide profile LP1 as well as a second guide profile LP2 that is formed parallel to it. In this case, the secondary profile 44 transitions, starting from the inner shroud 23A in the direction of the main profile 43, increasingly into the main profile 43, but, in the region of its profile leading edge or inflow edge, has a profile nose that is rotated toward the suction side and, in particular in the region of the suction side S (in relation to the suction side of the main profile 43), is concavely curved and, in the region of the pressure side D (in relation to the pressure side of the main profile 43), is convexly curved.

The second guide profiles LP2 extend, in particular, parallel to the secondary profiles 44 and likewise extend from the inner shroud 23A up to the first guide profiles LP1, which, in this exemplary embodiment, in particular, extend largely parallel to the inner shroud 23A. Owing to the fact that the profile geometry of the secondary profile 44 differs from that of the main profile 43, it is possible in the region of the radially inner end of the blade BI and thus in particular in the wall region, namely, in the region of the inner shroud 23A, for the flow to be influenced in an especially advantageous way, in particular the flows that arise and are associated with loss, such as, for example, the leakage flows LR, LS—for example, by feeding cooling air or blocking air LR—or the boundary layer flows GS, without causing excessively great detriment in the region of the main flow section HA. Instead, given an appropriate design or choice of the profile geometries in the secondary section NA, it is possible to achieve an improvement in efficiency by the reduction of flow losses. In each case, the improvement in efficiency that can be achieved here ensues, in particular, from the first guide profiles LP1, which extend largely in the axial direction x and in the peripheral direction, as well as through the altered curvature of the secondary profile 44 in the region of a profile leading edge, in particular owing to a rotating of the profile nose toward the suction side S.

In particular, in this case, the secondary profile or the secondary profiles 44 and/or the second guide profile or the second guide profiles LP2 is or are designed in such a way that, in the inlet region to the secondary channel, the inflow to them occurs in a manner that is as optimal as possible, in particular with a flow resistance that is as low as possible. That is, in particular in the inlet region to the secondary channel, they are adapted to the direction of the boundary flow and leakage flow, whereby, in particular, for this purpose, the respective profile leading edge is aligned in one direction, in particular in the mean direction of the boundary flow and the leakage flow.

In the outlet region, in contrast, the secondary profile or the secondary profiles 44 and/or the second guide profile or the second guide profiles LP2 is or are designed here, in particular, in such a way that, in the outlet region, they have a profile geometry that is adapted to the main profile or main profiles 43 in the associated outlet region in the main section and, in particular, have a similar or identical profile geometry and/or a profile geometry by means of which a flow in the secondary channel can be influenced in such a way that the flow exits from the secondary channel with a flow direction that is similar or identical to that of a particularly parallel, in particular central main flow HS, out of the main channel and/or in the region of the main section HA.

Although the second guide profiles LP2 also contribute to the improvement of the flow in the region of the radially inner end of the blade element EI, they serve primarily to better introduce the forces that occur during operation and act on the blade element 23 into a blade root 45, in particular in order to achieve a better distribution of force in the transition region from the main flow section HA to the secondary section NA as well as to the blade root 45.

For a better understanding of the different profile geometries in the different blade element segments HA and NA, FIG. 6a shows an unwound section made along the sectional plane A A through a plurality of rotating blades according to the invention in accordance with FIG. 2 or 5.

FIG. 6b shows an associated unwound section made along the sectional plane B-B, whereby the position of the sectional planes A-A and B-B can be seen from FIG. 5, which shows a side view the rotating blades 33 according to the invention from FIG. 2 in an illustration of the individual parts.

On the basis of FIG. 6a, which shows a cross section through the profile geometry of the blade element 13 in the region of the main flow section HA, it can clearly be seen that the profile geometry of the blade 13 has a geometry that is created advantageously for the main flow HS and, in particular, makes possible an advantageous flow inlet between the individual rotating blades 13 (see the direction of the arrow, which symbolizes the main flow direction HS). On the basis of this illustration, it can further be seen that, on the one hand, the blade elements 13 each have a concavely curved pressure side D as well as convexly curved suction side S and a first guide profile LP1, which extends in the peripheral direction and in the axial direction (which is symbolized in each case by the framed surfaces). The first guide profiles LP1 make possible an especially advantageous influencing of the flows that are subject to loss, which, in the present case, are illustrated symbolically by the direction vector VLG as a resulting vector.

In the secondary section NA, in contrast, the profile geometries of the blade element 13 each have a profile geometry that deviates from that of the main section HA, at least in the region of the profile leading edge, which, in relation to the illustration in FIG. 6b, is situated on the left side of the profile cross section. In particular, in each case, a profile nose or the front profile edge is rotated or curved toward the suction side S of the blade element 13. In this case, a front region around the profile leading edge has, in particular, a convex curvature on the suction side S and a concave curvature on the pressure side D. The midline of the secondary profile here follows roughly in an S-twist.

Furthermore, on the basis of FIG. 6b, it can be clearly seen that the individual rotating blades 33, in addition to the respective secondary profile of the blade element 13 in the secondary section NA (compare FIG. 5), further have an additional, second guide profile LP2, whereby, in each case, the additional guide profile LP2 extends, in particular, parallel to the front region of the secondary profile in the secondary section NA, in particular in the axial direction and in the radial direction.

In this case, the second guide profile LP2 extends in the axial direction x at least over a part of the length of the secondary profile or main profile of the blade element 13. However, this is not absolutely necessary, but rather it is possible for the second guide profile LP2 also to extend over a greater length or a lesser length in the axial direction x or else have a lesser extension in the radial direction y. Furthermore, it is not absolutely necessary to have a parallel course with respect to the front region of the secondary profile in the region of the secondary section NA of the blade element 13. In this way, however, it is possible to achieve especially good results in regard to influencing the flow, given an appropriately suitable design, in particular an appropriate angle of attack of the secondary profile and the second guide profile LP2.

In particular, owing to the rotating of the profile nose or the angle of attack of the profile of the secondary section NA toward the suction side, which can be seen on the basis of FIG. 6b, it is possible to achieve an especially advantageous influencing of the secondary flows that are subject to loss in the near-wall region, in particular in the region of an associated blade element end or in the region of a delimiting wall.

In this way, in particular by carrying the secondary flows through the secondary flow channel between the inner shroud 13A and the first guide profiles LP1, it is possible, given an appropriate design of the channel geometry, to influence the secondary flows that are subject to loss in such a way that a flow velocity and direction that match those of the main flow HS can be achieved, as a result of which flow losses can be reduced and the efficiency can be improved.

The advantageous embodiment of the rotating blade according to the invention, which is explained on the basis of FIGS. 6a and 6b, in particular in the region of a blade element end EI, can be extended by analogy to a guide vane and, namely, can be extended not only on the radially inner end region EI of a guide vane element, but also on the radial outer end region EA near the housing.

In some cases of application, it may also be advantageous to provide in each case, both in the region of the radially inner vane element end EI and in the region of the radially outer vane element end EA, a corresponding first guide profile LP1 for influencing the flow of the undesired secondary flows.

FIG. 7 shows an unwound section made along a sectional plane B-B, analogous to FIG. 6b, through a plurality of individual, adjacently arranged rotating blades with an alternative design of the profile in accordance with the invention, whereby, in this case, the secondary sections of the blade not only have a curved profile nose or leading edge that is rotated slightly toward the suction side, as in the example in FIG. 6b, but also the individual secondary sections NA, together with other secondary sections NA of a plurality of blades, each with the adjacent blades, in particular the secondary sections NA thereof, together form "subchannels" in the secondary channel, the course of which, in particular in the inlet region to the secondary channel, is parallel to the flow direction of the secondary flow VLG, in particular parallel to the resulting secondary flow. In this case, the "subchannels" can also be formed by perforations. Second guide profiles are not present.

FIG. 8 shows, by way of example, in longitudinal section, an excerpt of a second exemplary embodiment of a turbomachine 20 according to the invention that is constructed in such a way with a guide vane element 24 according to the invention, in which the guide vanes 34 of the stator, both in the region of the radially inner vane element end EI and in the region of the radially outer vane element end EA, each have a first guide profile LP1, which extends partly in the axial direction x and in the peripheral direction, and a second guide profile LP2, which extends in the axial direction x and in the radial direction, in the secondary section NA.

In this way, it is possible to advantageously influence both the GS and LS flows that are associated with loss in the region of the outer shroud 24B, and the GS and LR flows that are associated with loss in the region of the inner shroud LR, and, in particular, to divert them in the direction of the main flow HS.

FIGS. 9 to 11 show the guide vane segment 200 according to the invention for the guide vanes 24 according to the invention from FIG. 8 in perspective illustration, as well as various details in enlarged illustration, on the basis of which, in particular, the difference in the profile geometry between the main profile 47 in the main flow section HA and the secondary profile 46 in the secondary section NA can be seen, and the secondary flow channel in the secondary section NA formed by the inner shroud 24A and the first guide profiles LP1 as well as the noses of the secondary profiles 46, which are curved toward the suction side, can clearly be seen. Likewise clearly seen are the secondary profiles 46 and the second guide profiles LP2 in the region of the radially outer vane element end EA.

In this case, the secondary profiles 46 of the secondary sections NA of the guide vanes 24 form, together with the second guide profiles LP2, the flow profile in the secondary channel, which, among other things, is delimited by the outer shroud segments 24B and the first guide profiles LP1. The individual secondary channel profiles associated with a vane 24, which, in this case, include a secondary profile 46 as well as a second guide profile LP2, each likewise form here, in particular in interaction with the respective secondary channel profiles 46 and the second guide profiles LP2 of the neighbor vanes, the desired flow profile, in particular also a plurality of defined individual channels or "subchannels" inside of the secondary channel.

In this case, the profile geometry of the secondary profiles 46 as well as of the second guide profiles LP2 in the secondary channel is likewise adapted in the inlet region to the direction of the boundary flows and leakage flows and in the outlet region to the direction of the main flow HS.

FIG. 12 shows an enlarged excerpt of the turbomachine 20 according to the invention from FIG. 8 in the region of the radially outer vane element end EA of the guide vane 34. FIG. 13a shows the associated unwound section made through the vane elements 24 of the guide vanes 34 according to the invention from FIGS. 8 and 12 along the sectional plane A-A, and FIG. 13b shows the associated unwound section made along the sectional plane B-B.

On the basis of FIG. 13a, which shows a cross section through the profile geometries of the vane elements 24 of the guide vane segment 200 according to the invention from FIGS. 8 and 11 in the region of the main flow section HA, it can clearly be seen that the profile geometries of the vane elements 24 have a geometry that is advantageous for the main flow HS, as a result of which, in particular, an advantageous flow inlet between the individual rotating blades 24 is made possible (see the direction of the arrow, which symbolizes the main flow direction HS).

On the basis of this illustration, furthermore, it can clearly be seen that the blade elements 24 in the main section HA and in the secondary section NA, respectively, have a different geometry in the radial direction y as well as, in the secondary section NA, a profile nose that is curved toward the suction side S and diverse second guide profiles LP2, which extend in the axial direction and in the radial direction.

It can likewise clearly be seen that the blade elements 24 in the region of the main flow section have a profile nose that is curved toward the pressure side D. Likewise, no additional second guide profiles LP2 are present above the first guide profiles L1.

The invention makes it possible to provide blades or vanes, blade or vane segments, assemblies, as well as turbomachines with which, without any notable redesigns in the region of the main flow, an improved efficiency can be achieved, whereby the improvement in efficiency rests, in particular, on the minimization of flow losses in the region of the blade or vane element ends or in the region of the shrouds.

The design of a blade or vane according to the invention as well as the design of the individual profiles and profile sections are not limited here to the embodiments that are described above and depicted in the figures, but can also be exemplary embodiments that deviate from them. A blade or vane designed in accordance with the present invention can, in an alternative embodiment, have at least one secondary profile that is designed alternatively to the depicted secondary profiles 44, 46 and/or one first guide profile or a plurality of first guide profiles LP1 that are designed alternatively to the depicted first guide profiles LP1 and/or one second guide profile or a plurality of second guide profiles that are designed alternatively to the depicted second guide profiles LP2 or else no second guide profile, whereby, in particular, the profiles or profile sections associated with a blade or vane in the end region of the blade or vane, in particular in a secondary section and/or in a region provided as a secondary channel, are designed for creating, together with the profile or profiles of at least one neighbor blade or vane (in relation to a functional installed state or use state of the blade(s) or vane(s)), a defined flow profile, preferably an individual channel or "subchannel" or a plurality of individual channels and/or "subchannels" inside of the secondary channels, whereby the profiles or profile sections assigned to a blade or vane in the end region of the blade or vane are designed, in particular, for creating a flow profile by means of which flow losses in the near-wall region, in particular boundary layer flow losses, can be reduced.

Even though exemplary embodiments were explained in the description, it is noted that a large number of modifications are possible. Moreover, it is noted that the exemplary examples are merely examples, which are not intended in any way to limit the protective scope, the applications, and structure. Instead, the preceding description affords the person skilled in the art a guideline for implementing at least one of the exemplary embodiments, whereby diverse changes, in particular in regard to the function and arrangement of the described components can be made without leaving the protective scope as ensues from the claims and combinations of features equivalent to them.

What is claimed is:

1. A blade or vane for a turbomachine, comprising
   a blade or vane element with a blade or vane element profile,
   a radially inner end of the blade or vane element and a radially outer end of the blade or vane element,
   at least one first guide profile, arranged in a region of the radially inner end of the blade or vane element and/or of the radially outer end of the blade or vane element, the at least one first guide profile is spaced apart in the radial direction from a respective radially inner end of the blade or vane element or a radially outer end of the blade or vane element, and the at least one first guide profile extends at least partly in an axial direction, and at least partly in a peripheral direction, and/or in a tangential direction, wherein the axial direction, the peripheral direction, and the tangential direction are relative directions of the turbomachine,
   a main flow section with a main profile and a main profile geometry and
   at least one secondary section that has at least a secondary profile and secondary profile geometry that includes at least one secondary section that has a profile leading edge that is curved towards a suction side of the associated main profile section and/or the at least one secondary section has an S-twist in a flow direction.

2. The blade or vane according to claim 1, wherein at least one first guide profile extends starting from the suction side or the pressure side of the blade or vane element.

3. The blade or vane according to claim 1, wherein the blade or vane has at least one wall segment that delimits a flow channel and the at least one wall segment is joined to the blade or vane, a blade or vane element end, a ring segment, and/or an outer shroud segment of the turbomachine, wherein the at least one first guide profile is arranged in the radial direction spaced apart from the wall segment and extends in at least one radial plane and in the peripheral direction, parallel to the wall segment and/or is designed and arranged concentrically to the wall segment.

4. The blade or vane according to claim 1, wherein the secondary section extends in the radial direction from the main flow section up to the associated blade or vane element end.

5. The blade or vane according to claim 4, wherein the secondary profile of at least one secondary section has at least a secondary profile geometry that differs from that of the main profile geometry.

6. The blade or vane according to claim 1,
   wherein the blade or vane has at least one second guide profile, in addition to the blade or vane element profile, and
   wherein the at least one second guide profile extends at least partly in the axial direction and at least partly in the radial direction and is arranged spaced apart from the blade or vane element profile in the peripheral direction spaced apart from the secondary profile in the peripheral direction.

7. A blade or vane segment for a turbomachine, comprising
   a blade or vane segment having
       at least one first wall segment that delimits a flow channel,
   the at least one blade or vane having
       a blade or vane element with a blade or vane element profile, and
       a radially inner end of the blade or vane element and a radially outer end of the blade or vane element, wherein the radially inner end of the blade or vane element or the radially outer end of the blade or vane element is joined to the first wall segment,
       at least one first guide profile that is arranged in a region of at least one radially inner end of the blade or vane element and/or radially outer end of the blade or vane element, the at least one first guide profile is spaced apart from the associated blade or vane element end in the radial direction, and the at least one first guide profile extends at least partly in the axial direction and at least partly in the peripheral direction and/or in the tangential direction, wherein the axial direction, the peripheral direction, and the tangential direction are relative directions of the turbomachine, and
   a main flow section with a main profile and a main profile geometry and
   at least one secondary section that has at least a secondary profile and secondary profile geometry that includes at least one secondary section that has a profile leading edge that is curved towards the suction side of the associated main profile section and/or the at least one secondary section has an S-twist in the flow direction.

8. The blade or vane segment according to claim 7, wherein at least two first guide profiles, which extend in the peripheral direction, abut each other in the peripheral direction and form a first guide profile band segment that extends in the peripheral direction, wherein all first guide profiles form a common, closed, first guide profile band segment that extends in the peripheral direction.

9. The blade or vane segment according to claim 7, wherein the blade or vane segment has, in addition to the blade or vane element profile in the region of at least one radially inner end of the blade or vane element and/or radially outer end of the blade or vane element, at least one second additional guide profile, wherein the second guide profile extends at least partly in the axial direction and at least partly in the radial direction, and is arranged spaced apart from the blade or vane element profile in the peripheral direction.

10. The blade or vane segment according to claim 7, wherein at least one blade or vane of the blade or vane segment is provided.

\* \* \* \* \*